(12) United States Patent
Iwase et al.

(10) Patent No.: US 11,183,167 B2
(45) Date of Patent: Nov. 23, 2021

(54) DETERMINING AN OUTPUT POSITION OF A SUBJECT IN A NOTIFICATION BASED ON ATTENTION ACQUISITION DIFFICULTY

(71) Applicant: SONY CORPORATION, Tokyo (JP)

(72) Inventors: Hiro Iwase, Kanagawa (JP); Mari Saito, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 114 days.

(21) Appl. No.: 16/487,469

(22) PCT Filed: Dec. 25, 2017

(86) PCT No.: PCT/JP2017/046493
§ 371 (c)(1),
(2) Date: Aug. 21, 2019

(87) PCT Pub. No.: WO2018/173404
PCT Pub. Date: Sep. 27, 2018

(65) Prior Publication Data
US 2020/0193963 A1 Jun. 18, 2020

(30) Foreign Application Priority Data
Mar. 24, 2017 (JP) .............................. JP2017-059448

(51) Int. Cl.
*G10L 13/00* (2006.01)
*G06F 40/40* (2020.01)
(Continued)

(52) U.S. Cl.
CPC .............. *G10L 13/00* (2013.01); *G06F 40/40* (2020.01); *G10L 13/047* (2013.01); *G06K 9/00335* (2013.01)

(58) Field of Classification Search
CPC ....... G10L 19/018; G10L 25/30; G06F 40/40; G06F 3/167; G06K 9/00335
(Continued)

(56) References Cited

U.S. PATENT DOCUMENTS 9,075,435 B1 7/2015 Noble et al.
2014/0229175 A1\* 8/2014 Fischer .................. G10L 15/22
704/235

(Continued)

FOREIGN PATENT DOCUMENTS

JP 2013-057887 A 3/2013
JP 2015-132878 A 7/2015
(Continued)

OTHER PUBLICATIONS

Gao et al. "iHearFood: Eating Detection Using Commodity Bluetooth Headsets". 2016 IEEE First Conference on Connected Health: Applications, Systems and Engineering Technologies, pp. 163-172 (Year: 2016).*

(Continued)

*Primary Examiner* — Jesse S Pullias
(74) *Attorney, Agent, or Firm* — Chip Law Group

(57) ABSTRACT

The problem relates to making a user grasp notification contents more effectively. There is provided an information processing device including a control unit that controls information notification to a user based on notification contents, in which the control unit determines an output position of a subject in the notification contents on the basis of a calculated attention acquisition difficulty level related to the user. In addition, there is provided an information processing method including controlling, by a processor, information notification to a user based on notification contents, in which the controlling further includes determining an output position of a subject in the notification contents (Continued)

on the basis of a calculated attention acquisition difficulty level related to the user.

17 Claims, 13 Drawing Sheets

(51) Int. Cl.
*G10L 13/047* (2013.01)
*G06K 9/00* (2006.01)

(58) Field of Classification Search
USPC .................................................. 704/257–275
See application file for complete search history.

(56) References Cited

U.S. PATENT DOCUMENTS

| | | | |
|---|---|---|---|
| 2015/0006541 A1* | 1/2015 | Hampiholi | G06F 16/4387 707/741 |
| 2015/0217777 A1* | 8/2015 | Konigsberg | B60W 50/08 701/36 |
| 2015/0261387 A1 | 9/2015 | Petersen et al. | |
| 2015/0302718 A1* | 10/2015 | Konigsberg | A61B 5/18 340/575 |
| 2015/0328985 A1* | 11/2015 | Kim | A61B 5/18 180/272 |
| 2016/0231808 A1 | 8/2016 | Kato et al. | |
| 2016/0288708 A1* | 10/2016 | Chang | G06K 9/00845 |
| 2017/0249934 A1* | 8/2017 | Kang | G06F 40/30 |
| 2017/0337921 A1 | 11/2017 | Aoyama et al. | |
| 2018/0204570 A1* | 7/2018 | Puranik | B60K 37/06 |

FOREIGN PATENT DOCUMENTS

| | | |
|---|---|---|
| WO | 2015/104883 A1 | 7/2015 |
| WO | 2016/136062 A1 | 9/2016 |

OTHER PUBLICATIONS

International Search Report and Written Opinion of PCT Application No. PCT/JP2017/046493, dated Mar. 20, 2018, 08 pages of ISRWO.

Office Action for EP Patent Application No. 17901790.0, dated Jul. 27, 2021, 10 pages of Office Action.

* cited by examiner

DETERMINING AN OUTPUT POSITION OF A SUBJECT IN A NOTIFICATION BASED ON ATTENTION ACQUISITION DIFFICULTY

CROSS REFERENCE TO RELATED APPLICATIONS

This application is a U.S. National Phase of International Patent Application No. PCT/JP2017/046493 filed on Dec. 25, 2017, which claims priority benefit of Japanese Patent Application No. JP 2017-059448 filed in the Japan Patent Office on Mar. 24, 2017. Each of the above-referenced applications is hereby incorporated herein by reference in its entirety.

TECHNICAL FIELD

The present disclosure relates to an information processing device, and an information processing method.

BACKGROUND ART

In recent years, various agent devices, each of which performs information notification or the like to a user, are coming into widespread use. In addition, technologies for enhancing the convenience and accuracy of information notification by an agent device such as that described above are being developed. For example, Patent Document 1 discloses the technology in which the output order of speaking related to information notification is controlled on the basis of priority set beforehand.

CITATION LIST

Patent Document

Patent Document 1: Japanese Patent Application Laid-Open No. 2015-227951

SUMMARY OF THE INVENTION

Problems to be Solved by the Invention

However, in the technology described in the Patent Document 1, a situation of a user at the time of performing information notification is not taken into consideration. Therefore, in the technology described in the Patent Document 1, it is also assumed that notification contents having high priority are output in a situation in which attention of a user is not directed to the notification contents. Thus, there is also a possibility that the user will overlook important information.

Accordingly, the present disclosure proposes an information processing device and an information processing method, which enable a user to grasp notification contents more effectively, and which are novel and improved.

Solutions to Problems

According to the present disclosure, there is provided an information processing device including a control unit that controls information notification to a user based on notification contents, in which the control unit determines an output position of a subject in the notification contents on the basis of a calculated attention acquisition difficulty level related to the user.

In addition, according to the present disclosure, there is provided an information processing method including controlling, by a processor, information notification to a user based on notification contents, in which the controlling further includes determining an output position of a subject in the notification contents on the basis of a calculated attention acquisition difficulty level related to the user.

Effects of the Invention

As described above, according to the present disclosure, a user is enabled to grasp notification contents more effectively.

It should be noted that the above effects are not necessarily limitative, and along with or instead of the above effects, any effect described in the present description, or other effects that can be grasped from the present description, may be exhibited.

MODE FOR CARRYING OUT THE INVENTION

Figure 1:
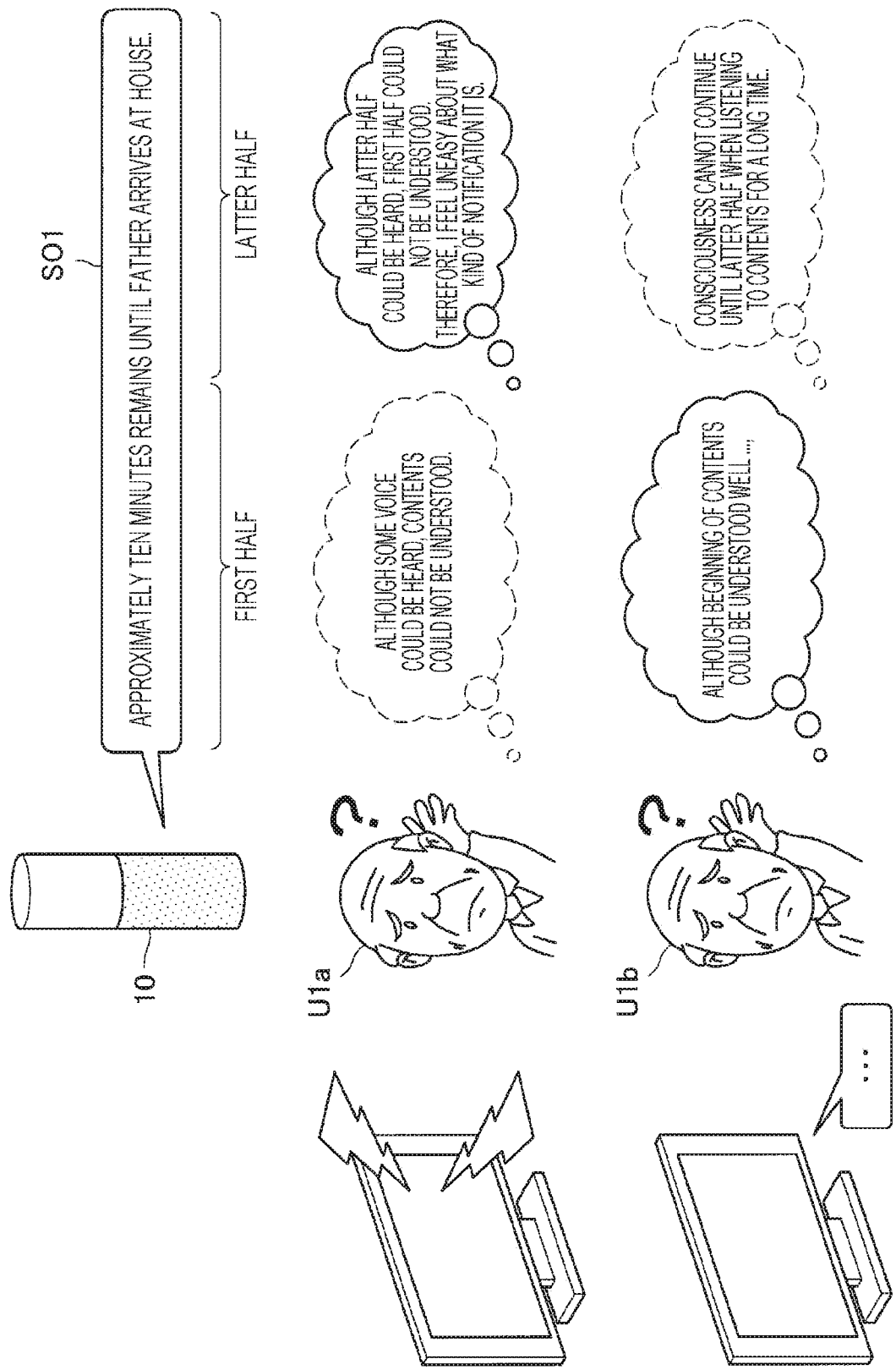
FIG. 1 is a drawing illustrating relationship between user's attention and understanding of notification contents according to one embodiment of the present disclosure.

Preferred embodiments of the present disclosure will be detailed below with reference to the accompanying drawings. It should be noted that components, described herein and on the drawings, having substantially identical functional configurations are provided with identical reference numbers, and explanation thereof will not be repeated.

It should be noted that explanations are made in the following order.

1. Embodiments
1.1. Outline of embodiments
1.2. System configuration example
1.3. Functional configuration example of information processing terminal 10
1.4. Functional configuration example of external device 20
1.5. Functional configuration example of information processing server 30
1.6. Details of determination of subject output position
1.7. Flow of operation of information processing server 30
2. Hardware configuration example
3. Summary 1. Embodiments 1.1. Outline of Embodiments First of all, an outline of one embodiment of the present disclosure will be described. As described above, in recent years, various kinds of agents are being developed. The agents such as that described above are capable of presenting various information to a user, for example, by speaking using an artificial voice.

In this case, the information presentations performed by agents are mainly classified into two that are a response and a notification. Here, the above-described response indicates that an agent presents information in response to an inquiry from a user. For example, a case where when an inquiry of "what is my schedule today?" is received from a user, an agent outputs "dinner is scheduled for tonight" in response to the inquiry corresponds to the above-described response.

Meanwhile, the above-described notification indicates that information is transmitted from an agent to a user. For example, a case where on the basis of having received an e-mail, an agent outputs, for example, "you have received an e-mail from A. Its contents are as follows . . . " corresponds to the above-described notification.

Here, as a main difference between the response and the notification, an attention degree (hereinafter also referred to as "attention") of a user can be mentioned. In the case of the response, the response is premised on an inquiry from a user. Therefore, when an agent outputs information, it is assumed that attention of the user is directed to the agent. Accordingly, in the case of the response, it can be said that there is a high possibility that the user will be able to grasp output information.

Meanwhile, in the case of the notification, information originating from an agent is output. Therefore, it is not always possible to immediately acquire attention of a user when the information is output. In addition, even in a case where attention of the user is directed to the agent, it is assumed that the attention gradually decreases with the lapse of time.

FIG. 1 is a drawing illustrating relationship between user's attention and understanding of notification contents. For example, as shown in the upper part of FIG. 1, in a case where information notification SO1 is output from the information processing terminal 10 in a situation in which a noise level is high, for example, because sounds are being output from a television apparatus, it is assumed that some amount of time is required until attention of a user U1a is acquired. Therefore, there is a case where with respect to the first half part of the information notification SO1 to which attention has not been directed, it is difficult for the user U1a to grasp the contents thereof.

Meanwhile, as shown in the lower part of FIG. 1, in a case where the information notification SO1 is output from the information processing terminal 10 in a situation in which a noise level is low, although it is relatively easy to acquire attention of a user U1b, it is assumed that the attention of the user U1b gradually decreases with the lapse of time, for example, because speaking by an artificial voice is generally characterized by monotonous intonation. Accordingly, with respect to the latter half part of the information notification SO1, the attention of the user U1b to the information notification SO1 having decreased, there is a possibility that the user U1b will fail to grasp the contents thereof.

The information processing device and the information processing method according to the present embodiment have been conceived of by paying attention to the above-described points, and realize appropriate information notification corresponding to a user's attention situation. Therefore, one of the features of the information processing device and the information processing method according to the present embodiment is that an output position of a subject in notification contents is determined on the basis of an attention acquisition difficulty level that is an indicator indicating a level of difficulty to acquire attention of a user, and an information processing terminal is caused to perform information notification in conformity with the output position.

More specifically, for example, in the case of the example shown in FIG. 1, in a situation in which a noise level is high, the information processing device according to the present embodiment determines that an attention acquisition difficulty level related to the user U1a is high, and therefore the information processing device may set a subject output position to the latter half of notification contents. In addition, for example, in a situation in which a noise level is low, the information processing device determines that an attention acquisition difficulty level related to the user U1b is low, and therefore the information processing device may set a subject output position to the first half of notification contents. According to the information processing device and the information processing method according to the present embodiment, a possibility that a user will fail to grasp a subject of notification contents can be greatly reduced, which enables to realize information notification, the convenience of which is enhanced.

1.2. System Configuration Example

Figure 2:
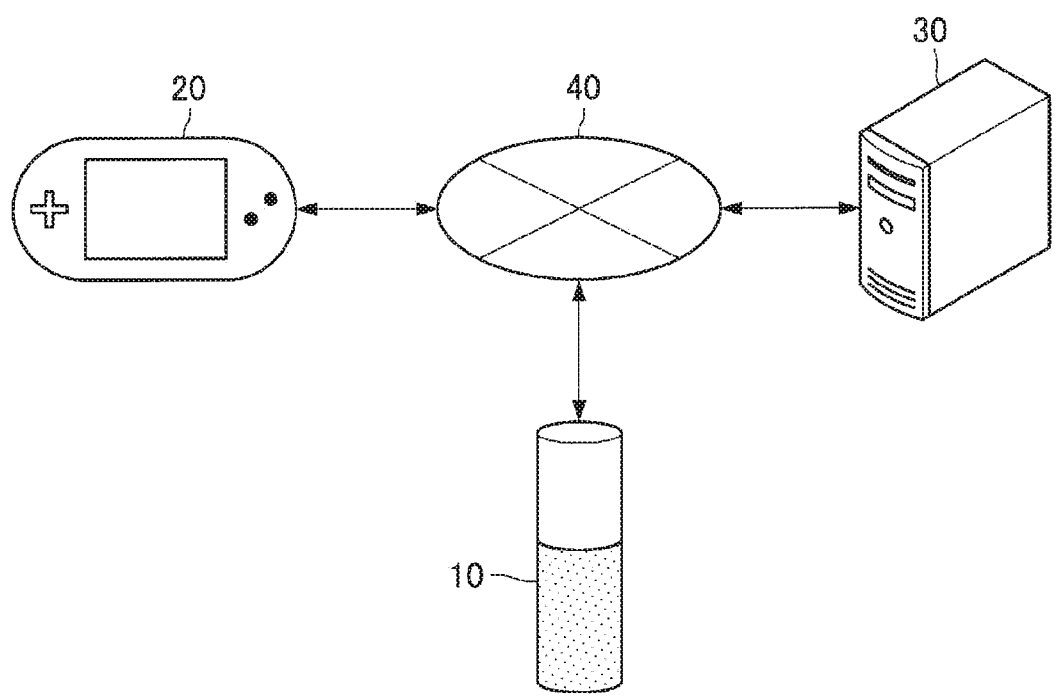
FIG. 2 illustrates an example of a system configuration diagram of an information processing system according to the embodiment.

Next, a system configuration example of an information processing system according to the present embodiment will be described. FIG. 2 illustrates an example of a system configuration diagram of an information processing system according to the present embodiment. Referring to FIG. 2, the information processing system according to the present embodiment is provided with the information processing terminal 10, the external device 20, and the information processing server 30. In addition, a connection is made between the information processing terminal 10 and the information processing server 30, and a connection is made between the external device 20 and the information processing server 30, so as to be capable of communicating with each other through a network 40.

(Information Processing Terminal 10)

The information processing terminal 10 according to the present embodiment is an information processing device that notifies a user of various information on the basis of the control by the information processing server 30. In particular, the information processing terminal 10 according to the present embodiment is capable of performing voice output of notification contents on the basis of a subject output position determined by the information processing server 30. The information processing terminal 10 according to the present embodiment may be, for example, a stationary type, a built-in type, or an autonomous moving type dedicated device. In addition, the information processing terminal 10 according to the present embodiment may be a mobile phone, a smart phone, a Personal Computer (PC), a tablet, or any of various wearable devices. The information processing terminal 10 according to the present embodiment is defined as any of various devices each having an information notification function by a sound.

Moreover, the information processing terminal 10 according to the present embodiment may have a function of collecting speaking sounds of a user, and surrounding sounds, and transmitting the collected sounds to the information processing server 30. Further, the information processing terminal 10 according to the present embodiment may capture an image of the user to transmit the image to the information processing server 30. Various information collected by the information processing terminal 10 can be used for calculation of an attention acquisition difficulty level by the information processing server 30 described later, and can be used for detection of attention behavior.

(External Device 20)

The external device 20 according to the present embodiment is an information processing device that transmits an operating situation of a device and collected sensor information to the information processing server 30. The operating situation and the sensor information can be used for the calculation of an attention acquisition difficulty level by the information processing server 30. For example, in a case where a certain external device 20 is being operated, it is assumed that the user is concentrating on the operation of the external device 20. Therefore, a situation in which it is hard to acquire attention is estimated. In this manner, the attention acquisition difficulty level according to the present embodiment can be acquired in consideration of not only noises but also the user's situation.

Therefore, the external device 20 according to the present embodiment may be any of various devices, each of which is operated or used by a user. It should be noted that although the example of FIG. 2 shows a case where the external device 20 is a game apparatus, the external device 20 according to the present embodiment is not limited to such an example. The external device 20 according to the present embodiment may be, for example, a portable telephone, a smart phone, a PC, a tablet, a wearable device or the like. In addition, the external device 20 according to the present embodiment may be an indoor facility or the like that includes various home electric appliances, office equipment, and lighting.

(Information Processing Server 30)

The information processing server 30 according to the present embodiment is an information processing device that controls information notification to a user by the information processing terminal 10. In this case, the information processing server 30 according to the present embodiment determines an output position of a subject in notification contents on the basis of an attention acquisition difficulty level related to the user, and is capable of causing the information processing terminal 10 to perform voice output of the notification contents in conformity with the output position.

As disclosed above, the attention acquisition difficulty level may be an indicator that indicates a level of difficulty to acquire user's attention. The information processing server 30 according to the present embodiment is capable of calculating the attention acquisition difficulty level on the basis of various information collected by the information processing terminal 10 and the external device 20.

(Network 40)

The network 40 has a function of connecting between the information processing terminal 10 and the information processing server 30, and between the information processing server 30 and the external device 20. The network 40 may include: a public network such as the Internet, a telephone network, and a satellite communication network; various kinds of Local Area Network (LAN) including Ethernet (registered trademark); and Wide Area Network (WAN); and the like. In addition, the network 40 may include a leased line network such as Internet Protocol-Virtual Private Network (IP-VPN). Moreover, the network 40 may include a wireless communication network such as Wi-Fi (registered trademark), and Bluetooth (registered trademark).

The system configuration example of the information processing system according to the present embodiment has been explained above. It should be noted that the above-described configuration described using FIG. 2 is merely an example, and the configuration of the information processing system according to the present embodiment is not limited to such an example. For example, the functions included in the information processing terminal 10 and the information processing server 30 according to the present embodiment may be realized by a single device. Moreover, the functions included in the information processing server 30 according to the present embodiment can also be realized by a plurality of devices in a distributed manner. The configuration of the information processing system according to the present embodiment may be flexibly deformed according to specifications and operation.

1.3. Functional Configuration Example of Information Processing Terminal 10

Figure 3:
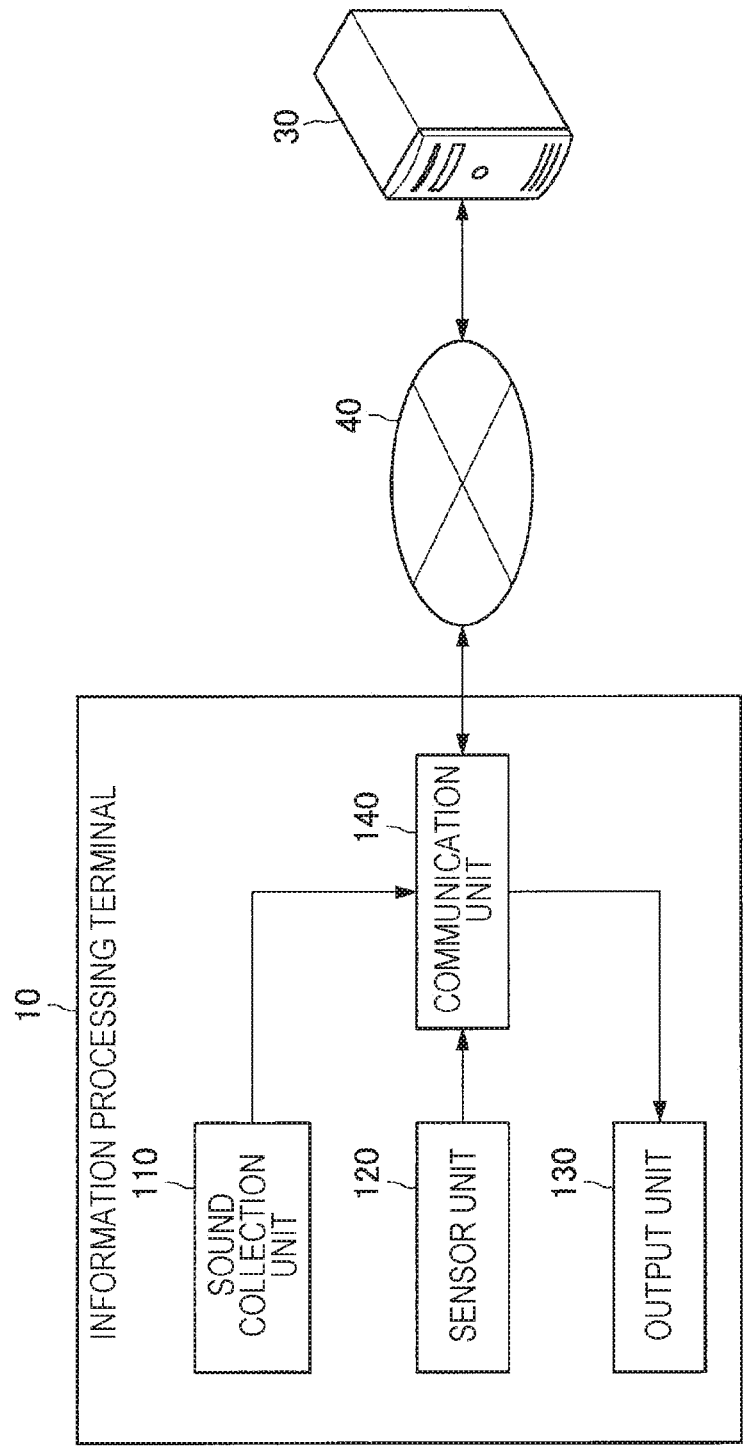
FIG. 3 illustrates an example of a functional block diagram of an information processing terminal according to the embodiment.

Next, a functional configuration example of the information processing terminal 10 according to the present embodiment will be described. FIG. 3 illustrates an example of a functional block diagram of the information processing terminal 10 according to the present embodiment. Referring to FIG. 3, the information processing terminal 10 according to the present embodiment is provided with a sound collection unit 110, a sensor unit 120, an output unit 130, and a communication unit 140.

(Sound Collection Unit 110)

The sound collection unit 110 has a function of collecting user's sounds and surrounding environmental sounds. The sound collection unit 110, for example, the sound collection unit 110 according to the present embodiment, is realized by a microphone that converts user's sounds and environmental sounds into an electric signal.

(Sensor Unit 120)

The sensor unit 120 has a function of capturing an image of a user. Therefore, the sensor unit 120 according to the present embodiment is provided with an image capturing sensor. In addition, the sensor unit 120 may collect various sensor information used for the estimation of a user's situation. Therefore, the sensor unit 120 is provided with, for example, an infrared sensor, an acceleration sensor, a gyro sensor, a terrestrial magnetic sensor, a vibration sensor, a pressure sensor, a Global Navigation Satellite System (GNSS) signal receiver or the like.

(Output Unit 130)

The output unit 130 has a function of outputting notification contents on the basis of the control by the information processing server 30. In this case, the output unit 130 may output a voice based on an artificial voice synthesized by the information processing server 30. Therefore, the output unit 130 according to the present embodiment is provided with a speaker and an amplifier.

In addition, the output unit 130 may output visual information on the basis of the control by the information processing server 30. In this case, the output unit 130 is provided with a display device such as a liquid crystal display (Liquid Crystal Display (LCD)) device, and an Organic Light Emitting Diode (OLED) device.

(Communication Unit 140)

The communication unit 140 has a function of performing information communication with the information processing server 30 through the network 40. Specifically, the communication unit 140 transmits sound information collected by the sound collection unit 110, and image information and sensor information, which have been collected by the sensor unit 120, to the information processing server 30. In addition, the communication unit 140 receives, from the information processing server 30, artificial voice information related to the notification contents, text information related to the notification contents, and the like.

The functional configuration example of the information processing terminal 10 according to the present embodiment has been explained above. It should be noted that the above-described configuration described using FIG. 3 is merely an example, and the configuration of the information processing terminal 10 according to the present embodiment is not limited to such an example. For example, the information processing terminal 10 according to the present embodiment may be further provided with a configuration other than that shown in FIG. 2. The information processing terminal 10 can be provided with, for example, an input unit that detects input operation by a user, and the like. The functional configuration of the information processing terminal 10 according to the present embodiment can be flexibly deformed.

1.4. Functional Configuration Example of External Device 20

Figure 4:
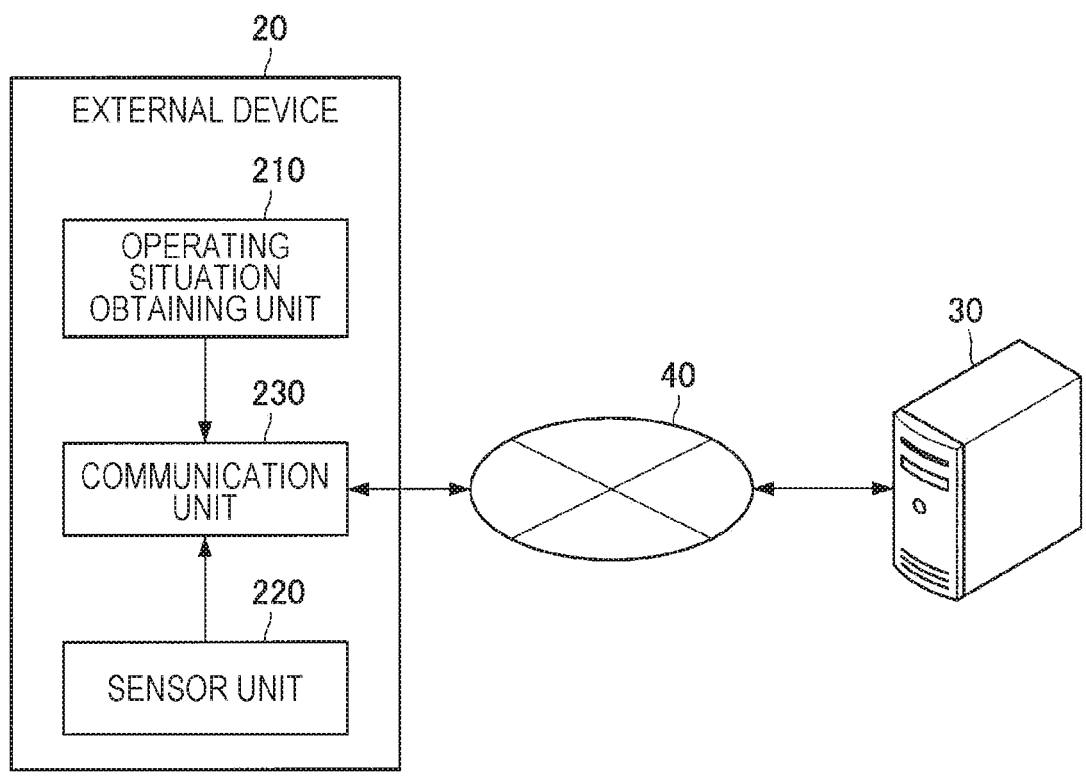
FIG. 4 illustrates an example of a functional block diagram of an external device according to the embodiment.

Next, a functional configuration example of the external device 20 according to the present embodiment will be described. FIG. 4 illustrates an example of a functional block diagram of the external device 20 according to the present embodiment. Referring to FIG. 4, the external device 20 according to the present embodiment is provided with an operating situation obtaining unit 210, a sensor unit 220, and a communication unit 230.

(Operating Situation Obtaining Unit 210)

The operating situation obtaining unit 210 has a function of obtaining an operating situation of a device. An operating situation of the external device 20 obtained by the operating situation obtaining unit 210 can be used by the information processing server 30 to calculate an attention acquisition difficulty level. For example, in a case where the external device 20 is a PC, a smart phone, or the like, the operating situation obtaining unit 210 may detect that a keyboard, a mouse, a touch panel or the like is being operated by a user. In addition, for example, in a case where the external device 20 is a game apparatus, the operating situation obtaining unit 210 may detect that a controller or the like is being operated by a user or the like.

Moreover, for example, in a case where the external device 20 is a device having a telephone call function, such as a telephone, the operating situation obtaining unit 210 may detect that a telephone call is being made. Further, for example, in a case where the external device 20 is a home electric appliance, the operating situation obtaining unit 210 may detect, for example, that a door of a refrigerator is open, that a thermal insulation function of a rice cooker is operating while a lid is open, or that a sucking operation of a vacuum cleaner is being performed. Furthermore, for example, in a case where the external device 20 is a television apparatus, the operating situation obtaining unit 210 may detect, for example, that a video image or a sound is being output, and a person exists in surroundings. In this case, for example, on the basis of sensor information collected by a human detection sensor, the operating situation obtaining unit 210 is capable of detecting that a person exists in surroundings. In this manner, the operating situation obtaining unit 210 according to the present embodiment is also capable of obtaining an operating situation of the external device 20 on the basis of various sensor information collected by the sensor unit 220.

Moreover, the operating situation obtaining unit 210 may obtain an operating situation of another external device 20, or may obtain operating situations of a plurality of external devices 20. The operating situation obtaining unit 210 according to the present embodiment is capable of estimating an operating situation of the external device 20 on the basis of sensor information related to another external device 20 collected by the sensor unit 220.

(Sensor Unit 220)

The sensor unit 220 has a function of collecting various sensor information related to the external device 20. The sensor information collected by the sensor unit 220 may be used by the operating situation obtaining unit 210 to obtain an operating situation. In addition, the sensor unit 220 may collect sensor information related to a user and surrounding circumstances. The sensor unit 220 is capable of obtaining, for example, speaking of a user, an image of the user, or the like. Therefore, the sensor unit 220 according to the present embodiment may be provided with various kinds of sensor devices. The sensor unit 220 is provided with, for example, a microphone, an image capturing sensor, a thermal sensor, a vibration sensor, a Illuminance sensor, a human detection sensor, an acceleration sensor, a gyro sensor, a terrestrial magnetic sensor or the like.

(Communication Unit 230)

The communication unit 230 has a function of performing information communication with the information processing server 30 through the network 40. Specifically, the communication unit 230 transmits the operating situation of the external device 20, which has been obtained by the operating situation obtaining unit 210, to the information processing server 30. In addition, the communication unit 230 may transmit the sensor information collected by the sensor unit 220 to the information processing server 30.

The functional configuration example of the external device 20 according to the present embodiment has been explained above. It should be noted that the above-described configuration described using FIG. 4 is merely an example, and the functional configuration of the external device 20 according to the present embodiment is not limited to such an example. The external device 20 according to the present embodiment can be provided with not only the above-described configuration but also various configurations corresponding to characteristics of the external device 20.

1.5. Functional Configuration Example of Information Processing Server 30

Figure 5:
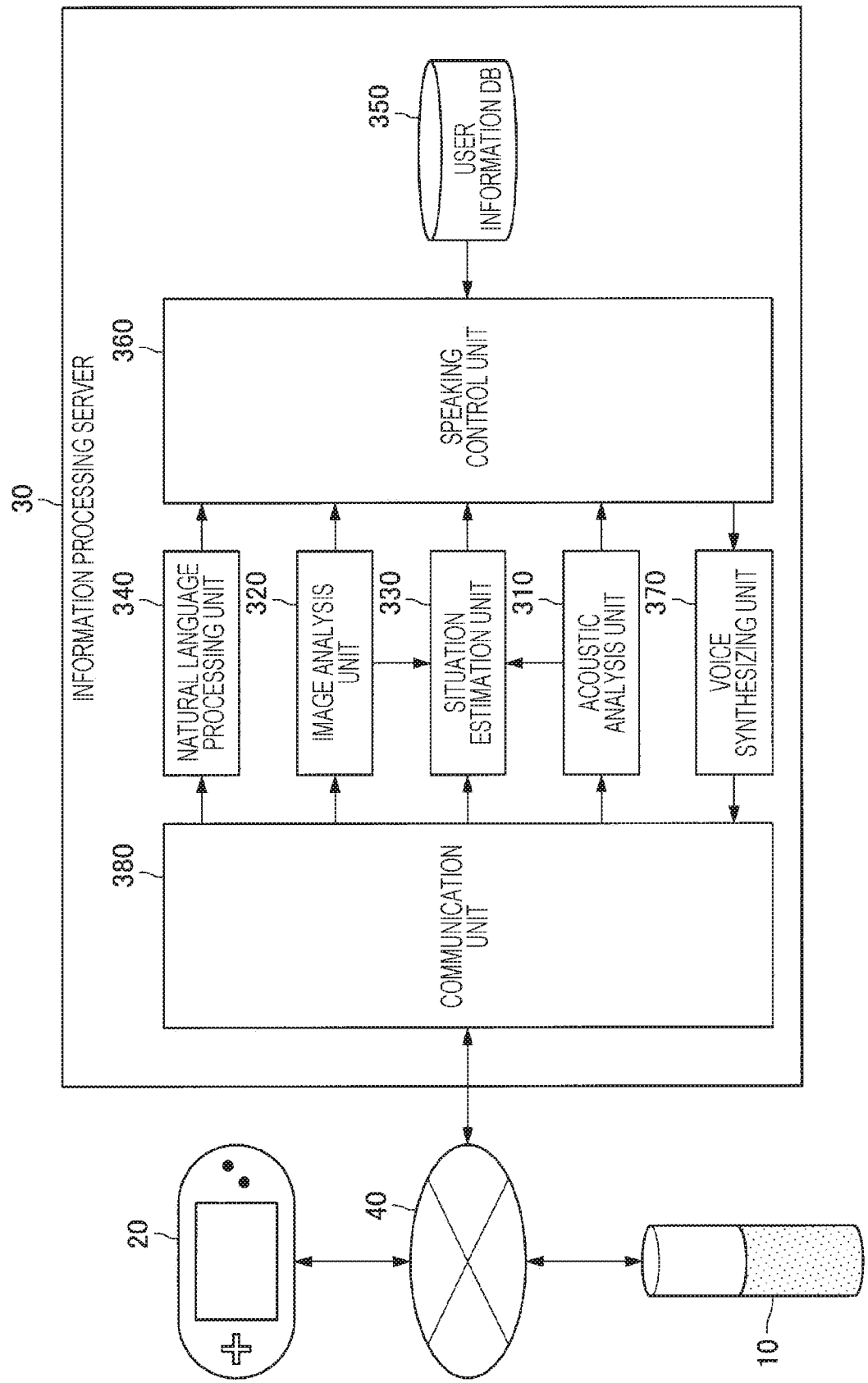
FIG. 5 illustrates an example of a functional block diagram of an information processing server according to the embodiment.

Next, a functional configuration example of the information processing server 30 according to the present embodiment will be described. FIG. 5 illustrates an example of a functional block diagram of the information processing server 30 according to the present embodiment. Referring to FIG. 5, the information processing server 30 is provided with an acoustic analysis unit 310, an image analysis unit 320, a situation estimation unit 330, a natural language processing unit 340, a user information DB 350, a speaking control unit 360, a voice synthesizing unit 370, and a communication unit 380.

(Acoustic Analysis Unit 310)

The acoustic analysis unit 310 has a function of recognizing a loudness on the basis of sound information transmitted from the information processing terminal 10 or the external device 20. More specifically, the acoustic analysis unit 310 according to the present embodiment may recognize a surrounding noise level. In this case, the acoustic analysis unit 310 according to the present embodiment is capable of calculating the noise level on the basis of, for example, a root-mean-square (also referred to as effective value or RMS) of an amplitude value of an acoustic signal per unit time. It should be noted that, for example, the frame time of one image captured by the information processing terminal 10 may be used as the above-described unit time. The noise level calculated by the acoustic analysis unit 310 according to the present embodiment is used for the calculation of the attention acquisition difficulty level by the situation estimation unit 330 described later.

In addition, the acoustic analysis unit 310 has a function of recognizing classification of a sound on the basis of sound information transmitted from the information processing terminal 10 or the external device 20. The acoustic analysis unit 310 according to the present embodiment may recognize, in particular, work sounds occurring from behavior of a user. The above-described work sounds include, for example, a sound occurring from user's operation of a keyboard of a PC, a sound occurring from user's operation of a home electric appliance such as a vacuum cleaner, and the like. In addition, the above-described work sounds include, for example, sounds occurring from user's operation carried out in a kitchen, such as washing, processes of food materials, and processing. Moreover, the above-described work sounds may include speaking by the user or other persons and the like. The work sounds recognized by the acoustic analysis unit 310 according to the present embodiment are used as one indicator of a user's behavior situation in the calculation of the attention acquisition difficulty level by the situation estimation unit 330 described later.

(Image Analysis Unit 320)

The image analysis unit 320 has a function of recognizing a situation of a user on the basis of image information and sensor information transmitted from the information processing terminal 10 or the external device 20. The image analysis unit 320 according to the present embodiment recognizes, in particular, a situation related to attention of a user. The image analysis unit 320 may recognize, for example, a distance from the information processing terminal 10 to the user. In this case, the image analysis unit 320 is capable of recognizing the above-described distance on the basis of, for example, a size of a user's face area in an image, and information collected by a depth sensor or the like. The user's situation recognized by the image analysis unit 320 according to the present embodiment is used for the calculation of the attention acquisition difficulty level, and the detection of attention behavior, by the situation estimation unit 330 described later.

In addition, the image analysis unit 320 may recognize the facial direction and sight line of a user. More specifically, the image analysis unit 320 is capable of recognizing a deviation of the facial direction and sight line of the user from a direction of the information processing terminal 10.

Moreover, the user's situation recognized by the image analysis unit 320 also includes a behavior situation. The image analysis unit 320 according to the present embodiment may recognize a behavior situation of a user on the basis of image information and sensor information transmitted from the information processing terminal 10 or the external device 20. On the basis of, for example, image information, the image analysis unit 320 may recognize that the user is reading a book, or is concentrating on studying or the like. In addition, on the basis of, for example, image information, acceleration information, angular speed information or the like, the image analysis unit 320 may recognize that the user is exercising. The user's behavior situation recognized by the image analysis unit 320 according to the present embodiment is used for the calculation of the attention acquisition difficulty level by the situation estimation unit 330 described later.

(Situation Estimation Unit 330)

The situation estimation unit 330 according to the present embodiment has a function of calculating an attention acquisition difficulty level that is an indicator indicating a level of difficulty to acquire attention of a user. In this case, the situation estimation unit 330 according to the present embodiment is capable of calculating the attention acquisition difficulty level on the basis of a noise level and a situation of the user. More specifically, the situation estimation unit 330 may calculate the attention acquisition difficulty level on the basis of, for example, the noise level recognized by the acoustic analysis unit 310, the directions of user's face and user's sight line recognized by the image analysis unit 320, and a distance between the user and the information processing terminal 10.

In addition, as disclosed above, the above-described user's situation includes user's behavior situation. In other words, the situation estimation unit 330 according to the present embodiment may calculate the attention acquisition difficulty level further on the basis of the work sounds recognized by the acoustic analysis unit 310, an operating situation of the external device 20 transmitted from the external device 20, and the user's behavior situation recognized by the image analysis unit 320.

In this manner, the situation estimation unit 330 according to the present embodiment is capable of comprehensively calculating a level of difficulty to acquire user's attention in consideration of various factors other than the noise level. In this case, the situation estimation unit 330 according to the present embodiment may calculate the attention acquisition difficulty level A by linearly combining weighting of each factor as shown in, for example, the undermentioned mathematical expression (1).

[Mathematical expression 1]

$$A = \sum_{i=1}^{n} (k_i \times F_i) \quad (1)$$

Here, $K_i$ in the above-described mathematical expression (1) indicates a weighting factor of each factor, and may be a value that is set on a factor basis. In addition, $F_i$ in the above-described mathematical expression (1) indicates a detection value of each factor.

For example, in a case where the factor is a noise level, the loudness (dB) recognized by the acoustic analysis unit 310, or a level value (for example, 1 to 10, etc.) corresponding to the loudness, may be input into the detection value $F_i$. In other words, the situation estimation unit 330 estimates that it is more difficult to acquire user's attention with the increase in noise level.

In addition, for example, in a case where the factor is a user's behavior situation, a value indicating whether or not corresponding behavior has been detected (for example, undetected: 0, detected: 1) may be input into the detection value $F_i$. As described above, the user's behavior situation includes the work sounds recognized by the acoustic analysis unit 310, the user's behavior situation recognized by the image analysis unit 320, or a user's behavior situation estimated by an operating situation of the external device 20. In other words, in a case where the user is performing another behavior, the situation estimation unit 330 estimates that it is difficult to acquire user's attention.

In addition, for example, in a case where the factor is a distance to the user, a value (cm, etc.) of the distance recognized by the image analysis unit 320, or a level value (for example, 1 to 10, etc.) corresponding to the distance, may be input into the detection value $F_i$. In other words, the situation estimation unit 330 estimates that the further the user is away from the information processing terminal 10, it is more difficult to acquire user's attention.

Moreover, for example, in a case where the factor is a direction of a user's face or sight line, for example, a value indicating whether or not a face or sight line faces the information processing terminal (for example, facing: 0, not facing: 1), or deviance (°) of a direction of the face or sight line from a direction of the information processing terminal 10 may be input into the detection value $F_i$. In other words, in a case where the information processing terminal 10 does not enter the visual field of the user, the situation estimation unit 330 estimates that it is difficult to acquire user's attention.

The example of the calculation of the attention acquisition difficulty level by the situation estimation unit 330 according to the present embodiment has been explained above. It should be noted that the above-described calculation method is merely an example, and the situation estimation unit 330 according to the present embodiment may calculate the attention acquisition difficulty level by using other mathematical expressions or techniques. In addition, by learning the calculated attention acquisition difficulty level and an actual user's reaction, the situation estimation unit 330 according to the present embodiment is also capable of optimizing factors used for the calculation of the attention acquisition difficulty level, and values of weighting factors.

Moreover, the situation estimation unit 330 according to the present embodiment has a function of detecting user's attention behavior. Here, the above-described attention behavior indicates user's behavior of reacting to notification contents output from the information processing terminal 10. In this case, the situation estimation unit 330 may detect attention behavior on the basis of the user's situation recognized by the image analysis unit 320. The situation estimation unit 330 is capable of detecting attention behavior on the basis that, for example, a user is approaching the information processing terminal 10, or the user's face or sight line is directed toward the direction of the information processing terminal 10.

Furthermore, the situation estimation unit 330 is also capable of detecting attention behavior on the basis of user's speaking recognized by the acoustic analysis unit 310. The situation estimation unit 330 is capable of detecting attention behavior on the basis that, for example, a user has performed speaking, such as "what?" and "Huh?".

(Natural Language Processing Unit 340)

The natural language processing unit 340 has a function of performing natural language processing such as morphological analysis, modification structure analysis, and giving of a semantic concept on the basis of text information related to notification contents. It should be noted that the text information related to notification contents may be held in the information processing server 30 beforehand, or may be obtained through the communication unit 380 and the network 40.

(User Information DB 350)

The user information DB 350 is a database that stores various information related to users. The user information DB 350 stores not only the name and ID of a user, but also attribute information such as, for example, age, distinction of sex, language, and hometown. The attribute information stored in the user information DB 350 according to the present embodiment is used for shaping of notification contents by the speaking control unit 360 described later. In addition, the user information DB 350 according to the present embodiment may store image information, voice features or the like of a user. In this case, the acoustic analysis unit 310 or the image analysis unit 320 is also capable of identifying a user on the basis of the above-described information stored in the user information DB 350. In addition, the user information DB 350 may store hobbies and diversions, a schedule or the like of a user.

(Speaking Control Unit 360)

The speaking control unit 360 has a function of controlling information notification to a user based on notification contents. More specifically, the speaking control unit 360 according to the present embodiment has a function of extracting a subject from notification contents on the basis of a result of natural language processing by the natural language processing unit 340, and has a function of determining an output position of a subject in the notification contents on the basis of an attention acquisition difficulty level calculated by the situation estimation unit 330. In addition, the speaking control unit 360 according to the present embodiment causes the information processing terminal 10 to output notification contents in conformity with the determined output position. It should be noted that the speaking control unit 360 may cause the information processing terminal 10 to output notification contents as visual information.

Figure 6:
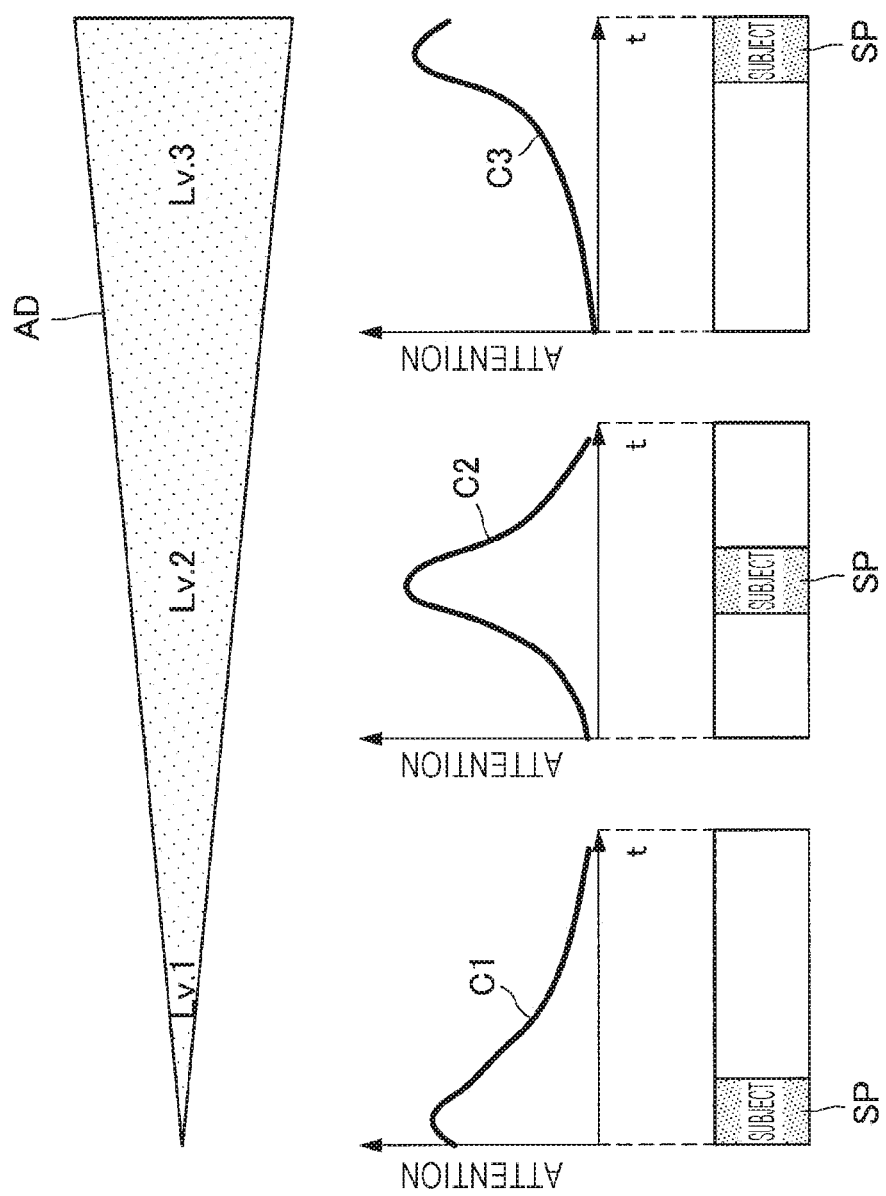
FIG. 6 is a drawing illustrating a basic concept of information notification by a speaking control unit according to the embodiment.

Here, a basic concept of the information notification control by the speaking control unit 360 according to the present embodiment will be described. FIG. 6 is a drawing illustrating a basic concept of information notification by the speaking control unit 360 according to the present embodiment. The upper part of FIG. 6 shows the strength of the attention acquisition difficulty level A calculated by the situation estimation unit 330 by using Levels 1 to 3, the middle part shows the transition of user's attention at each level, and the lower part shows a subject output position determined by the speaking control unit 360 at each level.

For example, in a case where the attention acquisition difficulty level A is Level 1, in other words, in a case where it is relatively easy to acquire user's attention, it is predicted that the user's attention is the highest immediately after starting of information notification, and subsequently decreases with the lapse of time t as shown by curve C1. In this case, the speaking control unit 360 according to the present embodiment may arrange an output position of a subject SP in the first half (in particular, in the beginning) of notification contents.

In addition, for example, in a case where the attention acquisition difficulty level A is Level 2, in other words, in a case where a level of difficulty to acquire user's attention is medium, it is predicted that user's attention increases with the lapse of time t, and subsequently decreases as shown by curve C2. In this case, the speaking control unit 360 according to the present embodiment may arrange the output position of the subject SP at a position close to the center of the notification contents.

Moreover, for example, in a case where the attention acquisition difficulty level A is Level 3, in other words, in a case where it is relatively difficult to acquire user's attention, it is predicted that user's attention is the lowest immediately after starting of information notification, and subsequently increases with the lapse of time t as shown by curve C3. In this case, the speaking control unit 360 according to the present embodiment may arrange the output position of the subject SP in the latter half (in particular, in the end) of the notification contents.

In this manner, according to the transition of user's attention corresponding to the attention acquisition difficulty level, the speaking control unit 360 according to the present embodiment is capable of outputting the subject in the timing in which it is estimated that the user's attention becomes the highest. According to the above-described control by the speaking control unit 360 according to the present embodiment, an output position of a subject of notification contents can be dynamically changed according to a situation of a user, which enables to notify the user of the subject of the notification contents in more effective timing.

(Voice Synthesizing Unit 370)

The voice synthesizing unit 370 has a function of generating an artificial voice based on notification contents shaped by the speaking control unit 360. The population voice generated by the voice synthesizing unit 370 is transmitted to the information processing terminal 10 through the communication unit 380 and the network 40, and is then subjected to audio output by the output unit 130.

(Communication Unit 380)

The communication unit 380 has a function of performing information communication with the information processing terminal 10 and the external device 20 through the network 40. Specifically, the communication unit 380 receives sound information, image information, and sensor information from the information processing terminal 10. In addition, the communication unit 380 receives an operating situation of the external device 20, and sensor information, from the external device 20. Moreover, the communication unit 380 transmits an artificial voice and text information, which relate to notification contents in which an output position of a subject has been specified by the speaking control unit 360, to the information processing terminal 10.

The functional configuration example of the information processing server 30 according to the present embodiment has been explained in detail above. It should be noted that the above-described configuration described using FIG. 5 is merely an example, and the functional configuration of the information processing server 30 according to the present embodiment is not limited to such an example. For example, each function included in the information processing server 30 can also be realized by a plurality of devices in a distributed manner. In addition, as disclosed above, the information processing server 30 may be further provided with a function included in the information processing terminal 10. In this case, the information processing server 30 is capable of performing, for example, voice output of notification contents in conformity with the determined subject output position. The functional configuration of the information processing server 30 according to the present embodiment may be deformed as appropriate according to specifications and operation.

1.6. Details of Determination of Subject Output Position

Figure 7:
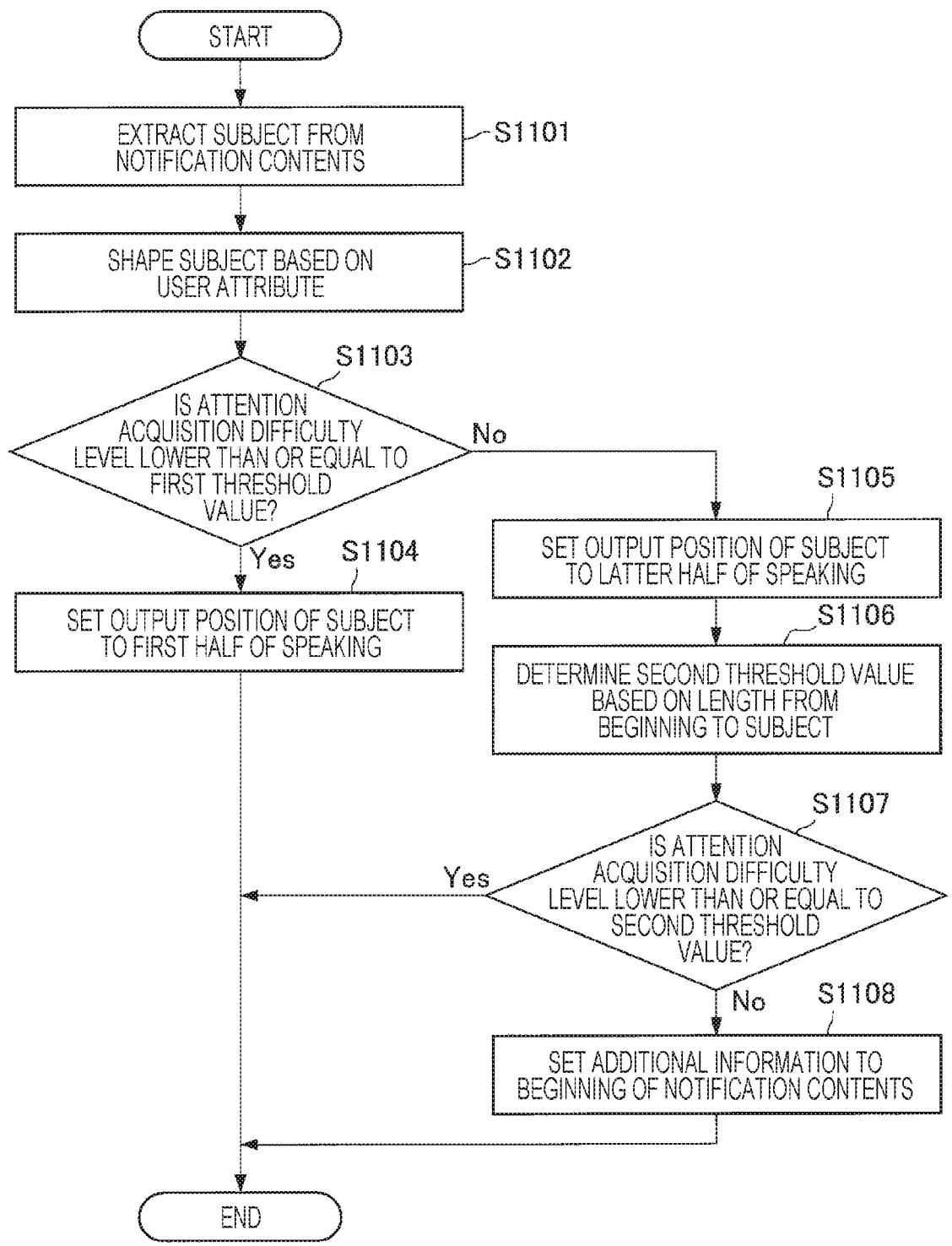
FIG. 7 is a flowchart illustrating a flow in which an output position of a subject is determined by the speaking control unit according to the embodiment.

Next, determination of an output position of a subject according to the present embodiment will be described in detail. FIG. 7 is a flowchart illustrating a flow in which an output position of a subject is determined by the speaking control unit 360 according to the present embodiment.

Referring to FIG. 7, first of all, the speaking control unit 360 extracts a subject from notification contents on the basis of a result of natural language processing by the natural language processing unit 340 (S1101).

Figure 8:
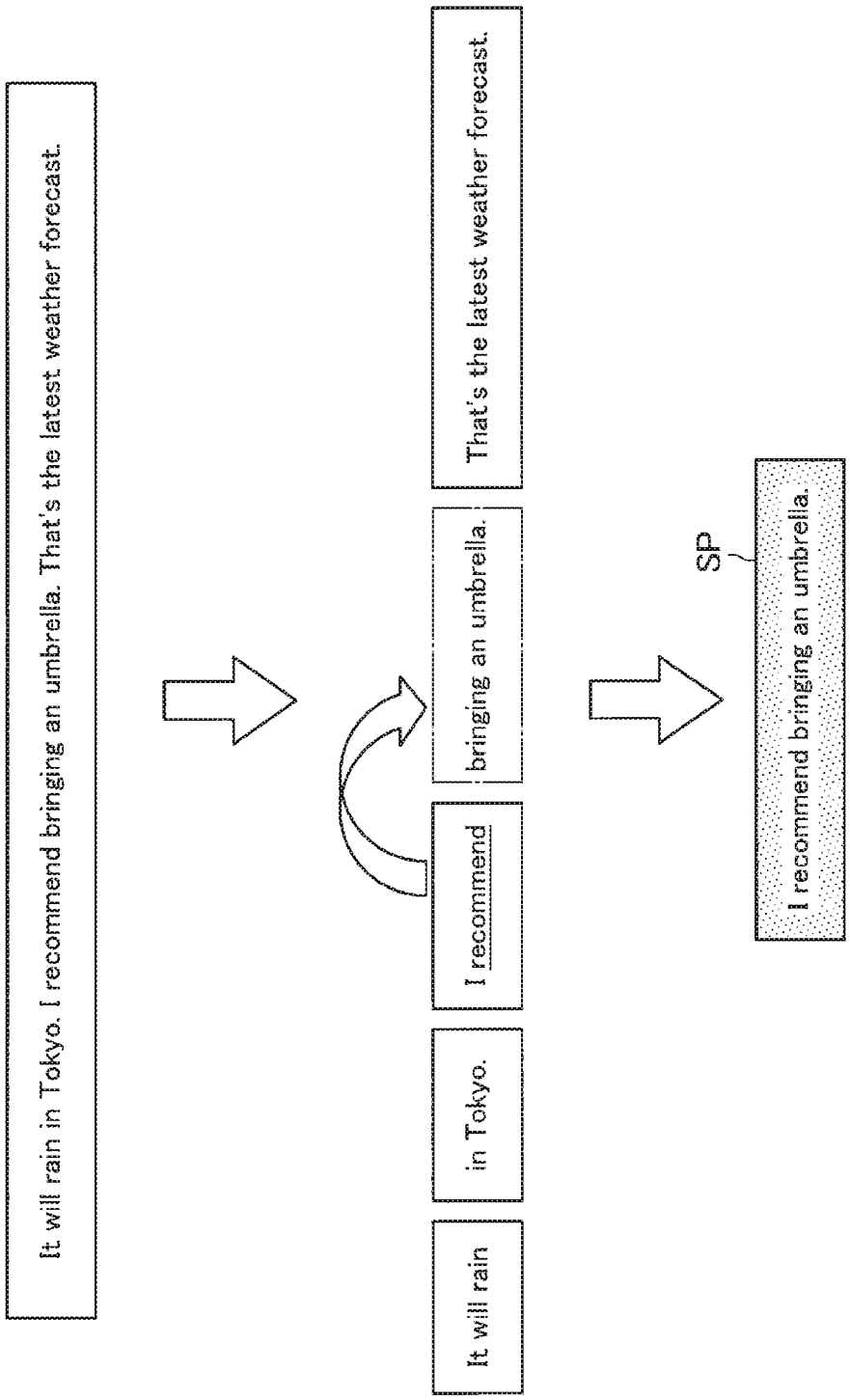
FIG. 8 is a drawing illustrating extraction of a subject by the speaking control unit according to the embodiment.

FIG. 8 is a drawing illustrating extraction of a subject by the speaking control unit 360 according to the present embodiment. The upper part of FIG. 8 indicates notification contents OS, and the middle part indicates each clause separated by the natural language processing unit 340. In addition, a kind of phrase and a semantic concept may be added to each clause by the natural language processing unit 340.

In this case, the speaking control unit 360 detects, from among the clauses, a clause containing wording having a semantic concept such as a "request", a "proposal", a "wish", or an "opinion". For example, as shown in FIG. 8, the speaking control unit 360 may detect "I recommend". Next, the speaking control unit 360 detects "bringing an umbrella." that is a clause having a case corresponding to the detected "I recommend", and thereby is capable of extracting a subject "I recommend bringing an umbrella.".

Meanwhile, the speaking control unit 360 may extract, as a subject, a clause containing a proper noun or a numerical value, and a predicate clause to which the clause depends. In addition, in a case where a part of notification contents is a message received by e-mail, Social Networking Service (SNS) or the like, the speaking control unit 360 may treat contents of the message as a subject. Incidentally, in this case, the speaking control unit 360 may delete, from the notification contents, information that is difficult to understand by voice or that is redundant, the information including the date and time of transmission of the message, an e-mail address of a transmitter, a URL, attribute information of the message, and the like.

Moreover, in a case where the speaking control unit 360 controls the output of visual information by the information processing terminal 10, the speaking control unit 360 may set, as a subject related to voice speaking, a sentence that requests confirmation of visual information displayed on a monitor or the like, and may cause the output unit 130 of the information processing terminal 10 to output details of the notification contents.

Referring to FIG. 7 again, the description of the flow in which an output position of a subject is determined by the speaking control unit 360 will be continued. On completion of the extraction of the subject in the step S1101, subsequently, the speaking control unit 360 shapes the extracted subject on the basis of attribute information of a user (S1102).

For example, in a case where the subject is "I recommend bringing an umbrella.", and a target user is a child, the speaking control unit 360 may shape the subject to be "You should take an umbrella." by using more direct expression.

In addition, for example, in a case where the language used in the notification contents is, for example, Japanese that is a language in which the word order can be relatively easily changed, the speaking control unit 360 may arrange a verb phrase at the top of a subject for a child user. Meanwhile, in a case where a user is an adult, the speaking control unit 360 is also capable of arranging a target noun phrase at the top of the subject.

In this manner, according to user's attribute information stored in the user DB 350 and characteristics of the used language, the speaking control unit 360 according to the present embodiment is capable of shaping a subject that is more easily grasped by the user.

It should be noted that with respect to shaping of a subject, the speaking control unit 360 may employ a pattern that is used by users in daily life. For example, by collecting user's speaking in daily life, the speaking control unit 360 is capable of learning the word order and words that are used by users for preference. In addition, the speaking control unit 360 may shape a subject into a pattern in which the user gets used to hearing in daily life. For example, in a case where a user is a child, the speaking control unit 360 is capable of shaping a subject by employing the word order and words that are used by a mother or the like for the user in daily life.

On completion of the shaping of the subject in the step S1102, subsequently, the speaking control unit 360 determines an output position of the subject on the basis of the attention acquisition difficulty level calculated by the situation estimation unit 330.

In this case, first of all, the speaking control unit 360 may determine whether or not the attention acquisition difficulty level is lower than or equal to a first threshold value (S1103). In other words, the speaking control unit 360 determines whether or not the attention acquisition difficulty level is equivalent to Level 1 at which attention can be relatively easily acquired.

Figure 9:
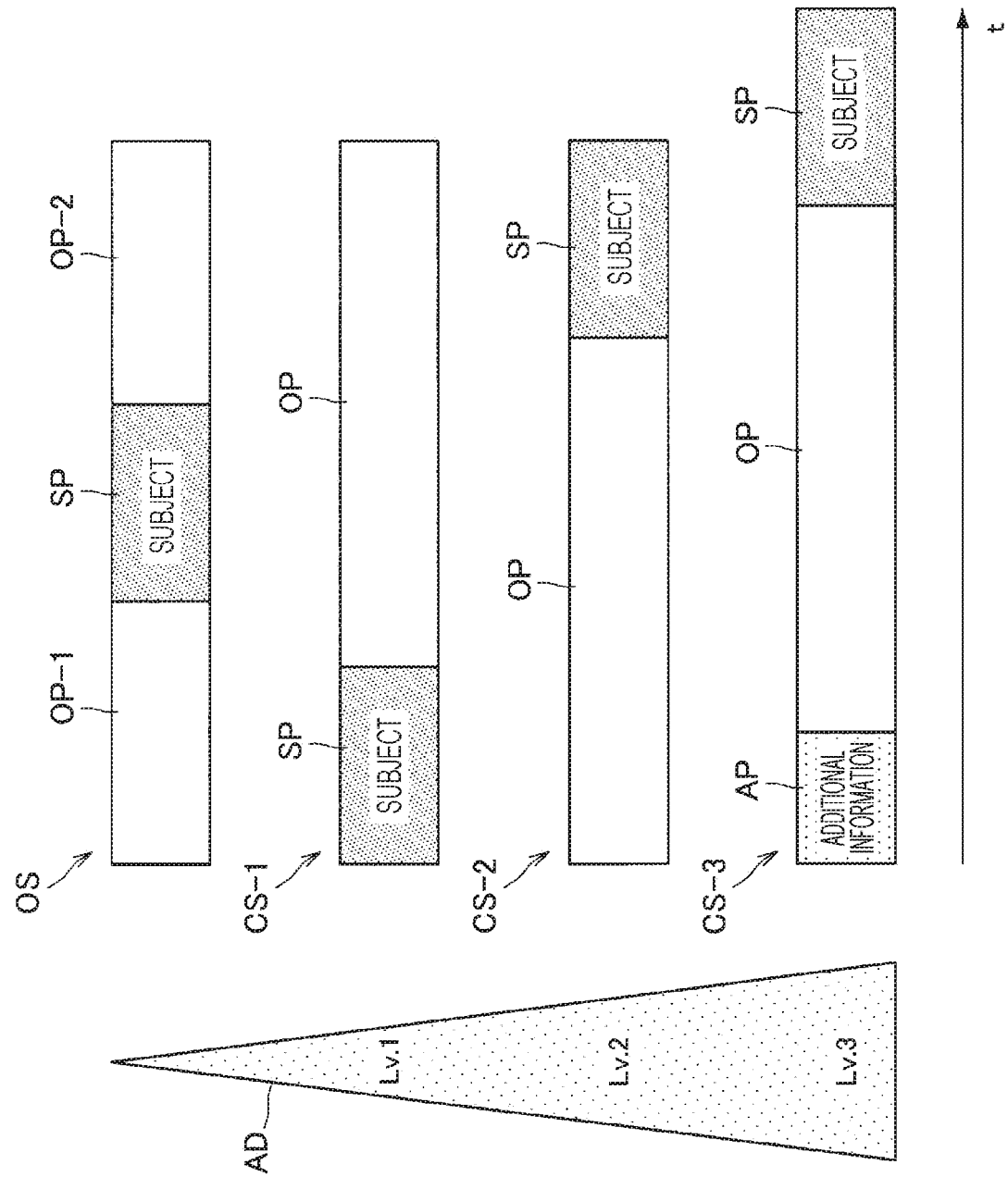
FIG. 9 is a drawing illustrating an example of a subject output position determined on the basis of an attention acquisition difficulty level according to the embodiment.

Here, in a case where the attention acquisition difficulty level is lower than or equal to the first threshold value (S1103:Yes), the speaking control unit 360 sets an output position of the subject shaped in the step S1102 to the first half of the notification contents as shown in FIG. 9 (S1104). FIG. 9 is a drawing illustrating an example of a subject output position determined on the basis of an attention acquisition difficulty level according to the present embodiment. It should be noted that the top part of FIG. 9 shows an original notification contents OS that include a subject SP, and the other sentences OP. Referring to FIG. 9, in a case where an attention acquisition difficulty level A is Level 1, it is revealed that the speaking control unit 360 generates new notification contents CS-1 from the original notification contents OS by changing a subject output position to the beginning. It should be noted that in this case, the speaking control unit 360 may save the notification contents CS-1 as a text file.

Meanwhile, in a case where the attention acquisition difficulty level is higher than the first threshold value (S1103:No), in other words, in a case where the attention acquisition difficulty level is Level 2 or more, the speaking control unit 360 sets the subject output position to the latter half of the notification contents (S1105). More specifically, as shown in FIG. 9, the speaking control unit 360 generates new notification contents CS-2 in which the output position of the subject SP is located at the end.

Next, the speaking control unit 360 measures a length from the beginning to the subject SP in the notification contents CS-2 generated in the step S1105, and determines a second threshold value, which is a boundary between Level 2 and Level 3, on the basis of the length (S1106). In this case, the speaking control unit 360 may measure the above-described length by counting the number of characters of the other sentences OP. In addition, the speaking control unit 360 determines the second threshold value in such a manner that the value becomes larger in proportion to the above-described length. With the increase in length of the other sentences OP, there is a higher possibility that user's attention will be acquired during the output of the other sentences OP without adding additional information described later. Meanwhile, in a case where the length of the other sentences OP is short, it becomes difficult to acquire user's attention during the output of the other sentences OP. Therefore, the speaking control unit 360 may set the second threshold value low so as to cause branching to Level 3 easily.

Next, the speaking control unit 360 determines whether or not the attention acquisition difficulty level is lower than or equal to the second threshold value determined in the step S1106 (S1107). In other words, the speaking control unit 360 determines whether or not the attention acquisition difficulty level is equivalent to Level 2.

Here, in a case where the attention acquisition difficulty level is higher than the second threshold value (S1107: No), in other words, in a case where the attention acquisition difficulty level is Level 3, the speaking control unit 360 generates notification contents CS-3 that is obtained by adding additional information AP to the beginning of the notification contents CS-2 as shown in FIG. 9 (S1108).

In this case, the speaking control unit 360 may determine the length of the additional information AP according to a height of the attention acquisition difficulty level A. For example, the speaking control unit 360 may add the additional information AP, the length of which is proportional to a value that is obtained by subtracting the second threshold value from the attention acquisition difficulty level A.

In addition, the speaking control unit 360 may add a related topic related to the original notification contents OS as the additional information AP. In this case, the speaking control unit 360 may obtain a name of a user, a schedule, hobbies and diversions and the like of the user, which are stored in the user DB 350, to generate a related topic by using these pieces of information, thereby inducing, what is called, a cocktail-party effect as an opportunity to acquire attention of the user. In addition, the speaking control unit 360 may cause the voice synthesizing unit 370 to synthesize sentences (the subject SP and the other sentences OP) derived from the original notification contents OP, and a related topic by different artificial voices, so as to explicitly inform the user that the output is a related topic.

It should be noted that the additional information AP according to the present embodiment is not limited to the related topic described above, but can be various kinds of information. For example, the additional information AP may be music or a radio program or the like. By causing music or a radio program corresponding to preferences of a user to be reproduced in the beginning, the speaking control unit 360 is capable of increasing the possibility that it will be possible to acquire attention of the user.

The flow in which the output position of the subject is determined by the speaking control unit 360 according to the present embodiment has been explained above. The speaking control unit 360 is capable of determining an output position of a subject according to the attention acquisition difficulty level as described above, and is capable of causing the information processing terminal 10 to output notification contents in conformity with the output position. According to the above-described function included in the speaking control unit 360 according to the present embodiment, a subject of notification contents can be presented in the timing in which it is estimated that attention of the user becomes the highest, which enables information notification effective for the user.

It should be noted that the output position of the subject described using FIG. 7 and FIG. 9 is merely an example, and therefore the subject output position determined by the speaking control unit 360 according to the present embodiment is not limited to such an example. For example, in a case where the original notification contents OP are sufficiently long, the speaking control unit 360 may determine the second threshold value related to the attention acquisition difficulty level earlier after the subject is shaped. In this case, the speaking control unit 360 is capable of determining Levels 1 to 3 at a time. In addition, in this case, in a case where the attention acquisition difficulty level is equivalent to Level 2, the speaking control unit 360 may arrange a subject output position at a position close to the center of notification contents. The function of determining a subject output position by the speaking control unit 360 according to the present embodiment can be flexibly deformed according to the original notification contents OP and a language used.

Subsequently, a function of changing a subject output position during outputting of notification contents, by the speaking control unit 360, according to the present embodiment will be described. In a case where attention behavior of a user is detected during outputting of notification contents, the speaking control unit 360 according to the present embodiment may perform the control of changing an output position of a subject.

More specifically, the speaking control unit 360 according to the present embodiment is capable of changing the output position of the subject on the basis that attention behavior has been detected during outputting of additional information that has been added to the beginning of the notification contents.

Figure 10:
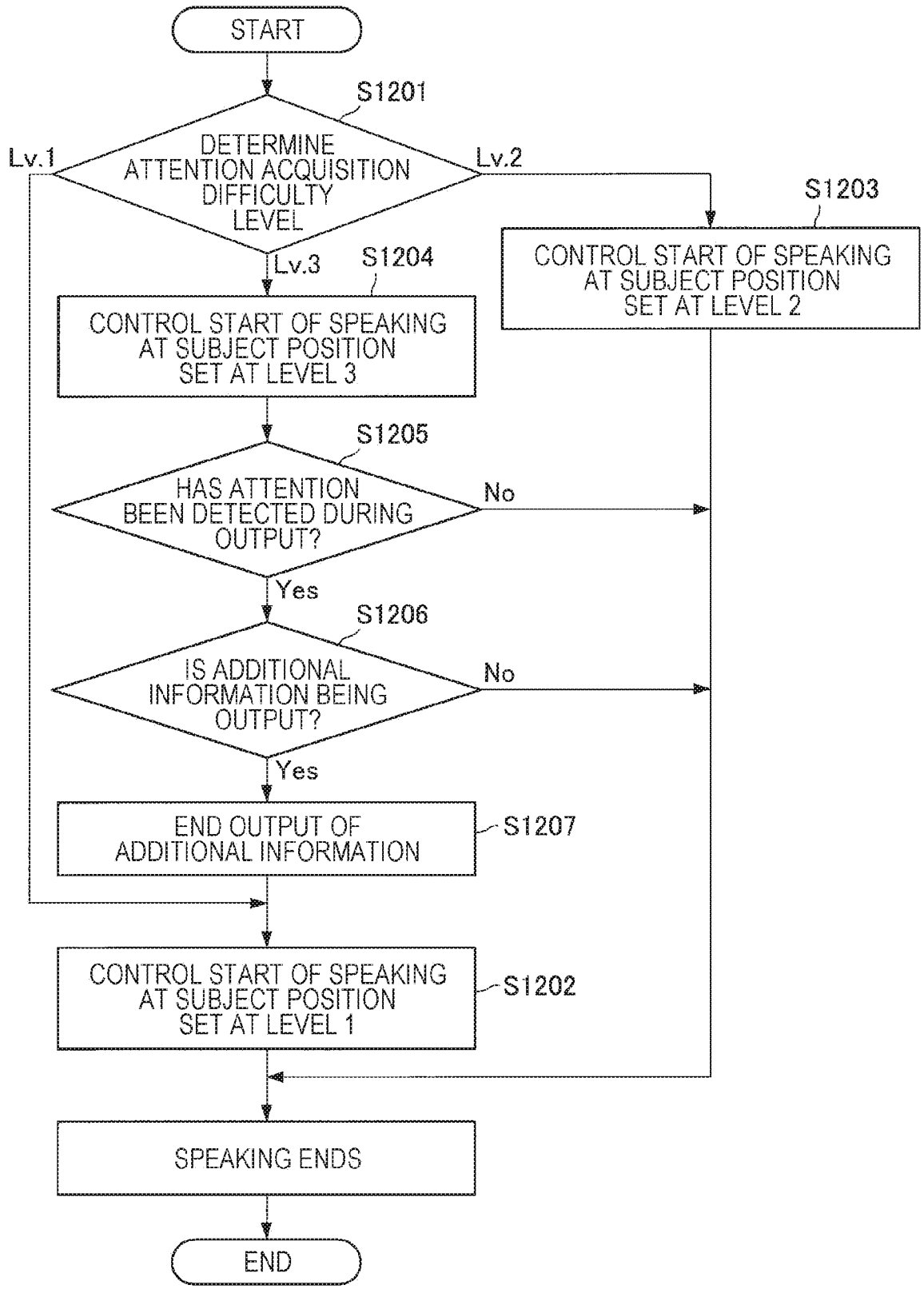
FIG. 10 is a flowchart illustrating a flow of output control of notification contents by the speaking control unit according to the embodiment.

FIG. 10 is a flowchart illustrating a flow of output control of notification contents by the speaking control unit 360 according to the present embodiment.

Referring to FIG. 10, first of all, the speaking control unit 360 determines which level an attention acquisition difficulty level is equivalent to (S1201).

Here, in a case where the attention acquisition difficulty level is Level 1 (S1201: Level 1), the speaking control unit 360 controls the information processing terminal 10 to start outputting of notification contents at a subject output position (notification contents CS-1) set at Level 1 (S1202), and causes the information processing terminal 10 to output the notification contents as they are to the end.

Meanwhile, in a case where the attention acquisition difficulty level is Level 2 (S1201: Level 2), the speaking control unit 360 controls the information processing terminal 10 to start outputting of notification contents at a subject output position (notification contents CS-2) set at Level 2 (S1203), and causes the information processing terminal 10 to output the notification contents as they are to the end.

Meanwhile, in a case where the attention acquisition difficulty level is Level 3 (S1201: Level 3), the speaking control unit 360 controls the information processing terminal 10 to start outputting of notification contents at a subject output position (notification contents CS-3) set at Level 3 (S1204).

In a case where the speaking control unit 360 controls starting of outputting the notification contents CS-3 corresponding to Level 3, the speaking control unit 360 subsequently continues detection and determination of attention behavior during outputting (S1205).

Here, in a case where attention behavior has been detected (S1205: Yes), the speaking control unit 360 subsequently determines whether or not additional information is being output (S1206).

Here, in a case where additional information is being output (S1206: Yes), in other words, in a case where attention behavior has been detected during outputting of the additional information, the speaking control unit 360 causes the information processing terminal 10 to end outputting of the additional information (S1207), and causes the information processing terminal 10 to start outputting of the notification contents at the subject output position set at Level 1. In this case, the speaking control unit 360 may dynamically change, for example, string information related to the notification contents. In addition, by generating texts corresponding to two sets of notification contents related to Level 1 and Level 3 beforehand, the speaking control unit 360 is also capable of switching to the text corresponding to the notification contents of Level 1 on the basis of having detected attention behavior.

Figure 11:
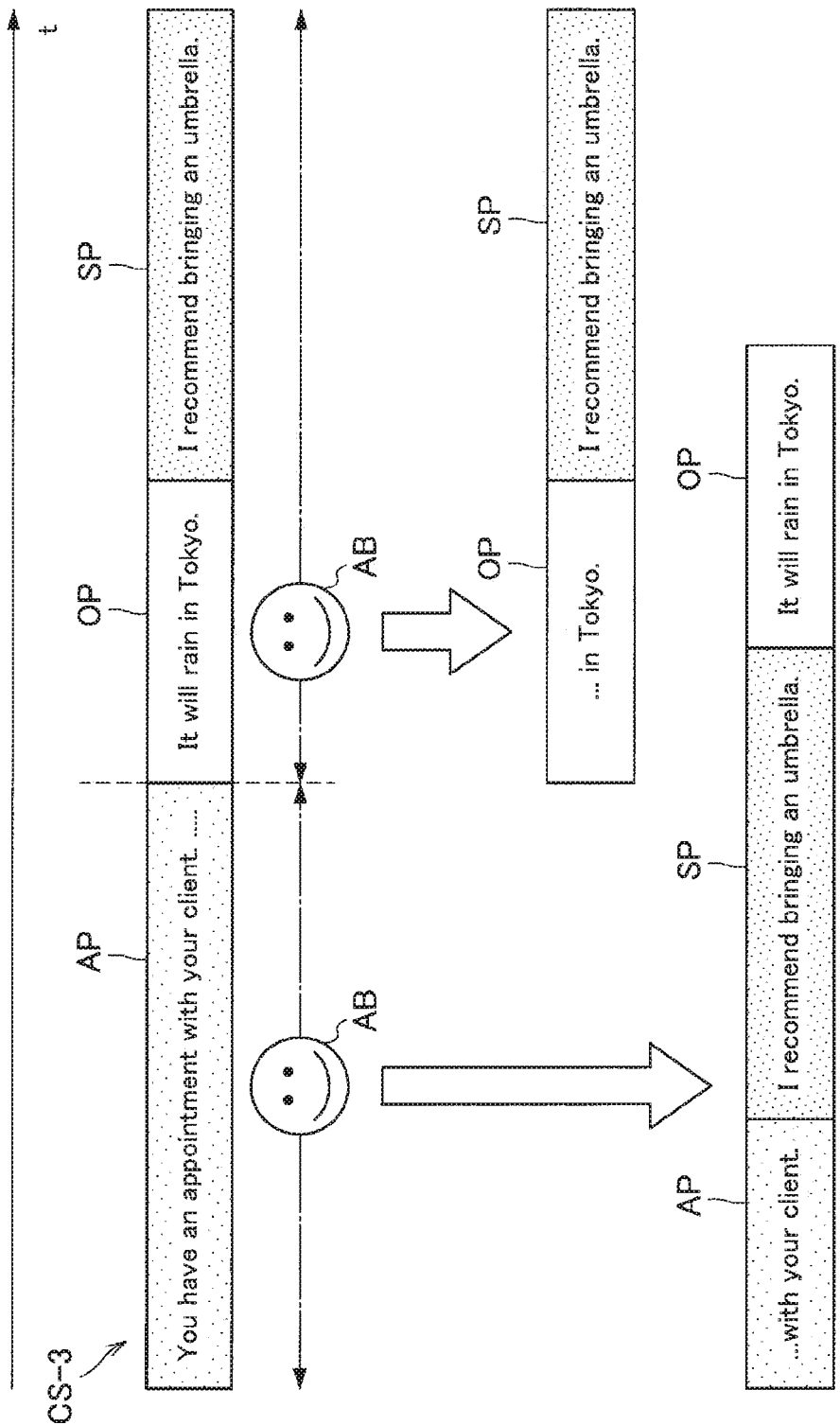
FIG. 11 is a drawing illustrating a specific example of output control of notification contents performed in a case where an attention acquisition difficulty level is Level 3 according to the embodiment.

FIG. 11 is a drawing illustrating a specific example of output control of notification contents performed in a case where the attention acquisition difficulty level is Level 3 according to the present embodiment. The upper part of FIG. 11 shows notification contents CS-3 set in a case where the attention acquisition difficulty level is Level 3. In this case, as described above, the additional information AP is added to the beginning of the notification contents CS-3, and the subject SP is arranged at the end of the notification contents CS-3.

Here, in a case where attention behavior AB of a user is detected during outputting of the additional information AP, as shown in the lower part of FIG. 11, the speaking control unit 360 causes outputting of the additional information AP to be ended in the middle so as to change the output position of the subject SP to a position immediately after the additional information AP. In this case, the speaking control unit 360 may end outputting of the additional information AP, for example, in the timing in which a sentence that is being output is output to the end. In addition, by causing speaking that links between the additional information AP and the subject SP to be performed, the speaking control unit 360 is also capable of reducing a sense of discomfort at the time of switching. Moreover, in a case where the additional information AP is music or a radio program, the speaking control unit 360 may control a volume to gradually decrease in such a manner that outputting is more naturally switched.

Meanwhile, in a case where user's attention behavior AB has been detected during outputting of other sentences OP, as shown in the middle part of FIG. 11, the speaking control unit 360 may output the other sentences OP and the subject SP as they are before ending processing related to the speaking control.

The output control of notification contents by the speaking control unit 360 according to the present embodiment has been explained above. As described above, according to the speaking control unit 360 according to the present embodiment, an output position of a subject in notification contents can be flexibly controlled according to a state of a user, which enables more effective information notification.

It should be noted that the above explanation using FIGS. 10 and 11 contains the case where the output position of the subject is changed in a case where the speaking control unit 360 has detected user's attention behavior. However, the control of changing an output position of a subject according to the present embodiment is not limited to such an example. The speaking control unit 360 according to the present embodiment is also capable of changing the output position of the subject on the basis of having detected a change in attention acquisition difficulty level of a user during outputting of notification contents.

For example, while additional information of the notification contents CS-3 shown in FIG. 11 is output, the speaking control unit 360 detects that an attention acquisition difficulty level of a user has changed to Level 1 or Level 2. Subsequently, the speaking control unit 360 is also capable of performing the output control such as that shown in the lower part in the figure. In addition, for example, in a case where the attention acquisition difficulty level is Level 2, the speaking control unit 360 may insert the additional information AP before a subject output position on the basis that the attention acquisition difficulty level has changed to Level 3 during outputting of the other sentences OP.

Moreover, the speaking control unit 360 is also capable of controlling the notification contents to be output again on the basis of a change in attention acquisition difficulty level. For example, in a case where the attention acquisition difficulty level is Level 2 or Level 3, when attention behavior of a user could not be detected, the speaking control unit 360 may cause the notification contents to be output again in the timing in which the attention acquisition difficulty level of the user has decreased.

In addition, the notification contents may be output again on the basis of a request by user's speaking or the like. In this case, it is expected that user's attention could not have been acquired during outputting of a subject. Therefore, the speaking control unit 360 stores the number of times the request has been made, and in the next output of notification contents, the speaking control unit 360 may calculate the attention acquisition difficulty level rather highly so as to delay the subject output position according to the number of times the request has been made.

Meanwhile, in a case where attention behavior has been detected during outputting of the additional information AP, the speaking control unit 360 stores the number of times attention behavior has been detected on a user basis, and in the next output of notification contents, the speaking control unit 360 may calculate the attention acquisition difficulty level rather low so as to advance the subject output position according to the number of times attention behavior has been detected.

1.7. Flow of Operation of Information Processing Server 30

Figure 12:
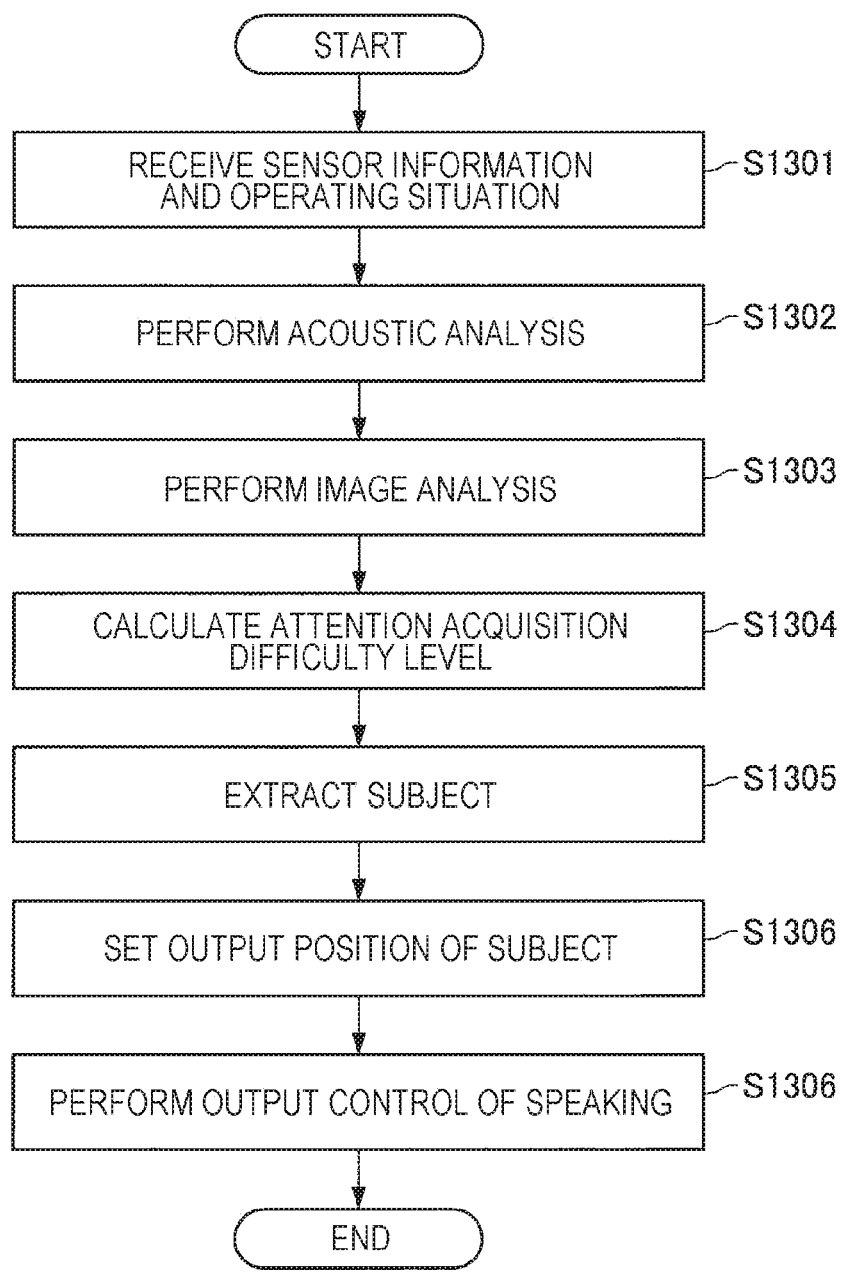
FIG. 12 is a flowchart illustrating a flow of operation of an information processing server according to the embodiment.

Next, a flow of overall operation of the information processing server 30 according to the present embodiment will be described. FIG. 12 is a flowchart illustrating a flow of operation of the information processing server 30 according to the present embodiment.

Referring to FIG. 12, first of all, the communication unit 380 of the information processing server 30 receives sensor information and an operating situation from the information processing terminal 10 and the external device 20 (S1301). Here, the above-described sensor information includes sound information and image information.

Next, the acoustic analysis unit 310 carries out acoustic analysis based on the sound information received in the step S1301 (S1302). In this case, the acoustic analysis unit 310 may perform analysis related to a noise level and work sounds.

In addition, the image analysis unit 320 carries out image analysis based on the image information received in the step S1302 (S1302). In this case, the image analysis unit 320 may perform analysis related to a situation of a user.

Next, the situation estimation unit 330 calculates an attention acquisition difficulty level of the user on the basis of the operating situation of the external device 20 received in the step S1301, and information obtained by the analyses in the steps S1302 and S1303 (S1304).

Next, the speaking control unit 360 extracts a subject from notification contents (S1305).

Subsequently, on the basis of the attention acquisition difficulty level calculated in the step S1304, the speaking control unit 360 sets an output position of the subject extracted in the step S1305 (S1306).

Subsequently, the speaking control unit 360 performs the speaking control based on the subject output position set in the step S1306 (S1307).

2. Hardware Configuration Example

Figure 13:
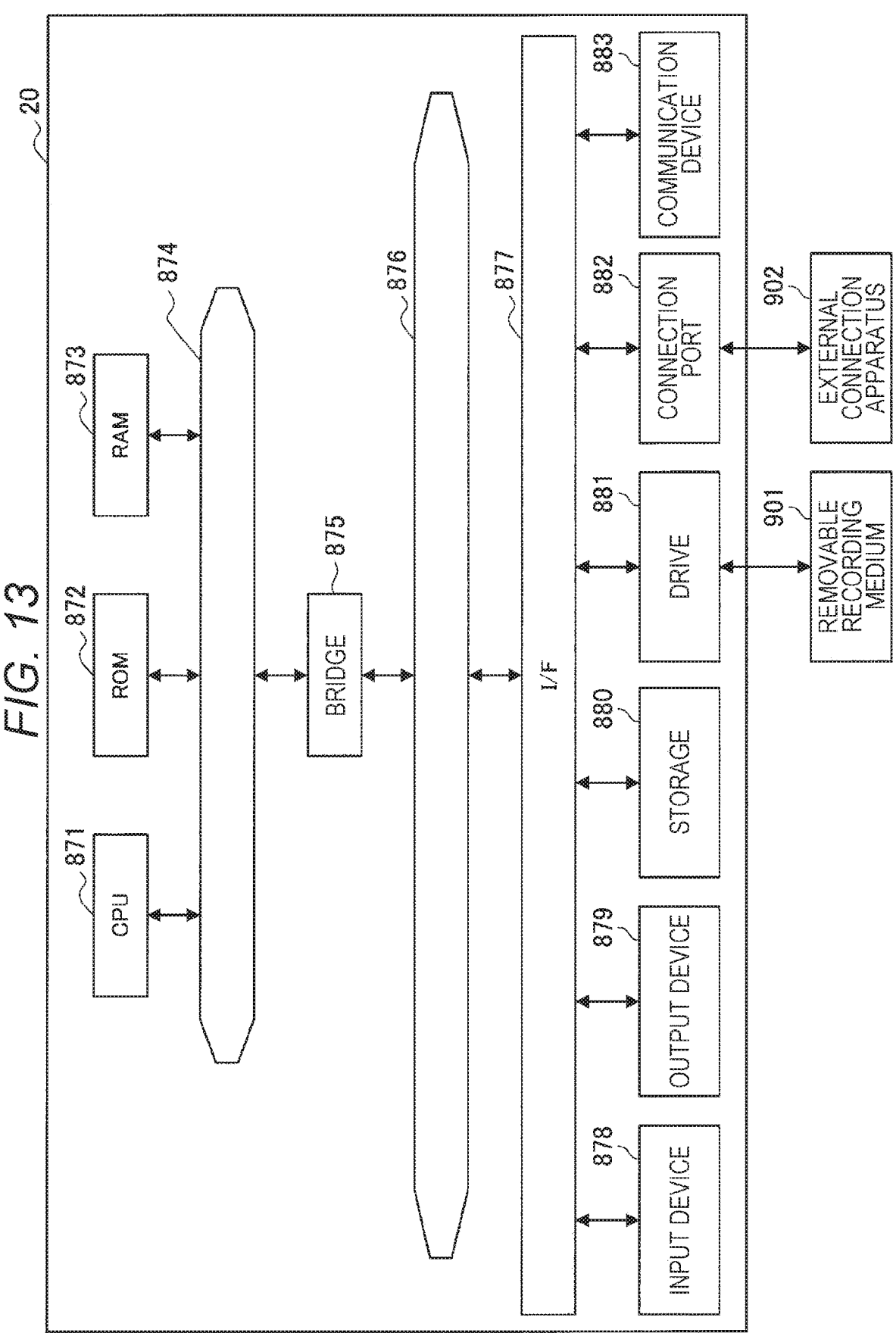
FIG. 13 is a diagram illustrating an example of a hardware configuration according to one embodiment of the present disclosure.

Next, an example of a hardware configuration that is shared by the information processing terminal 10 and the information processing server 30 according to one embodiment of the present disclosure will be described. FIG. 13 is a block diagram illustrating an example of a hardware configuration of the information processing terminal 10 and the information processing server 30 according to one embodiment of the present disclosure. Referring to FIG. 13, the information processing terminal 10 and the information processing server 30 each include, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. It should be noted that a hardware configuration shown here is an example, and thus components may be partially omitted. In addition, the hardware configuration may further include components other than the components shown here.

(CPU871)

The CPU 871 functions as, for example, a computation processing device or a control device, and controls all or a part of operation of each component on the basis of various programs recorded in the ROM 872, the RAM 873, the storage 880 or a removable recording medium 901.

(ROM872, RAM873)

The ROM 872 is a means for storing, for example, a program read into the CPU 871, and data used for computation. The RAM 873 temporarily or permanently stores, for example, a program read into the CPU 871, various parameters that change as appropriate when the program is executed, and the like.

(Host Bus 874, Bridge 875, External Bus 876, Interface 877)

The CPU 871, the ROM 872 and the RAM 873 are connected to one another through, for example, the host bus 874 that enables high-speed data transmission. Meanwhile, the host bus 874 is connected to the external bus 876, the data transmission rate of which is relatively low, through, for example, the bridge 875. In addition, the external bus 876 is connected to various components through the interface 877.

(Input Device 878)

For example, a mouse, a keyboard, a touch panel, a button, a switch, a lever and the like are used as the input device 878. Moreover, as the input device 878, a remote controller (hereinafter, referred to as "remote control") that is capable of transmitting a control signal by using infrared rays or other electrical waves may be used. In addition, the input device 878 includes a voice input device such as a microphone.

(Output Device 879)

The output device 879 is a device that is capable of visually or audibly notifying a user of obtained information, the device including, for example: a display device such as a Cathode Ray Tube (CRT), a LCD or an organic EL; an audio output device such as speaker, and a head phone; a printer; a portable telephone; a facsimile; or the like. In addition, the output device 879 according to the present disclosure includes various vibration devices, each of which is capable of outputting a tactile stimulation.

(Storage 880)

The storage 880 is a device for storing various data. For example, a magnetic storage device such as a hard disk drive (HDD), a semiconductor storage device, an optical storage device, a magneto-optical storage device or the like is used as the storage 880.

(Drive 881)

The drive 881 is a device that reads information recorded on, for example, the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, a HD DVD medium, a various semiconductor storage media or the like. Needless to say, the removable recording medium 901 may be, for example, an IC card equipped with a non-contact IC chip, an electronic apparatus, or the like.

(Connection Port 882)

The connection port 882 is, for example, a Universal Serial Bus (USB) port, an IEEE1394 port, a Small Computer System Interface (SCSI), an RS-232C port, or a port for connecting the external connection apparatus 902 such as an optical audio terminal.

(External Connection Apparatus 902)

The external connection apparatus 902 is, for example, a printer, a portable music player, a digital camera, a digital video camera, an IC recorder, or the like.

(Communication Device 883)

The communication device 883 is a communication device for connecting to a network, and is, for example, a wired or wireless LAN, Bluetooth (registered trademark), or a communication card for Wireless USB (WUSB), a router for optical communication, a router for Asymmetric Digital Subscriber Line (ADSL), or a modem for various communications.

3. Summary

As described above, one of the features of the information processing server 30 according to the present disclosure is that an output position of a subject in notification contents is determined on the basis of an attention acquisition difficulty level that is an indicator indicating a level of difficulty to acquire attention of a user, and the information processing terminal is caused to perform information notification in conformity with the output position. According to such a configuration, the user is enabled to grasp notification contents more effectively.

The preferable embodiments of the present disclosure have been described in detail as above with reference to the accompanying drawings. However, the technical scope of the present disclosure is not limited to such an example. It is clear that those who have ordinary skills in the technical field of the present disclosure can conceive of various correction examples or modification examples within the category of the technical idea set forth in the claims. It should be understood that, as a matter of course, these examples also belong to the technical scope of the present disclosure.

For example, in the above-described embodiment, the case where the information processing server 30 controls the voice output of notification contents based on the determined subject output position has been mainly described. However, the information processing server 30 may control the output of visual information based on the subject output position. For example, the information processing server 30 is capable of controlling text scrolling or the like related to notification contents in a display device with which the information processing terminal 10 is provided. In this case, the information processing server 30 may control the subject output position in the text scrolling on the basis of the attention acquisition difficulty level of the user.

In addition, each step related to the processing of the information processing server 30 in the present description is not always required to be time-sequentially processed in the order described in the flowchart. For example, each step related to the processing of the information processing server 30 may be processed in the order different from the order described in the flowchart, or may be processed in a parallel manner.

Furthermore, the effects described in the present description are to be construed as merely descriptive or illustrative, and are not limitative. In other words, the technology according to the present disclosure can achieve, along with or instead of the above effects, other effects apparent to a person skilled in the art from the statement of the present description.

It should be noted that the following configurations also belong to the technical scope of the present disclosure.

(1)

An information processing device including a control unit that controls information notification to a user based on notification contents, in which the control unit determines an output position of a subject in the notification contents on the basis of a calculated attention acquisition difficulty level related to the user.

(2)

The information processing device set forth in the preceding (1), in which the control unit controls voice output of the notification contents in conformity with the output position.

(3)

The information processing device set forth in the preceding (1) or (2), in which the control unit sets the output position of the subject to the first half of the notification contents on the basis that the attention acquisition difficulty level is lower than or equal to a first threshold value.

(4)

The information processing device set forth in any of the preceding (1) to (3), in which the control unit sets the output position of the subject to the latter half of the notification contents on the basis that the attention acquisition difficulty level is higher than the first threshold value.

(5)

The information processing device set forth in any of the preceding (1) to (4), in which on the basis that the attention acquisition difficulty level is higher than a second threshold value, the control unit adds additional information to a beginning of the notification contents, and causes the notification contents that includes the additional information to be output.

(6)

The information processing device set forth in any of the preceding (1) to (5), in which the control unit changes the output position of the subject on the basis that attention behavior of the user has been detected during outputting of the notification contents.

(7)

The information processing device set forth in the preceding (6), in which the control unit changes the output position of the subject on the basis that the attention behavior has been detected during outputting of additional information included in the beginning of the notification contents.

(8)

The information processing device set forth in the preceding (7), in which on the basis that the attention behavior has been detected during outputting of the additional information, the control unit ends outputting of the additional information, and changes the output position of the subject to a position immediately after the additional information.

(9)

The information processing device set forth in any of the preceding (1) to (8), in which the control unit changes the output position of the subject on the basis of a change in the attention acquisition difficulty level during outputting of the notification contents.

(10)

The information processing device set forth in any of the preceding (5), (7) and (8), in which the additional information includes a related topic related to the notification contents.

(11)

The information processing device set forth in any of the preceding (1) to (10), in which the control unit extracts the subject from the notification contents on the basis of a result of natural language processing.

(12)

The information processing device set forth in any of the preceding (1) to (11), in which the attention acquisition difficulty level is calculated on the basis of at least one of a noise level or a situation of the user.

(13)

The information processing device set forth in the preceding (12), in which:

the situation of the user includes a behavior situation of the user; and the attention acquisition difficulty level is calculated on the basis of at least the behavior situation of the user.

(14)

The information processing device set forth in the preceding (13), in which the behavior situation of the user is estimated on the basis of at least work sounds occurring from the behavior of the user.

(15)

The information processing device set forth in the preceding (13) or (14), in which the behavior situation of the user is estimated on the basis of at least an operating situation of an external device.

(16)

The information processing device set forth in any of the preceding (13) to (15), in which the behavior situation of the user is estimated on the basis of at least an image of the user.

(17)

The information processing device set forth in any of the preceding (1) to (16), further including a situation estimation unit that calculates the attention acquisition difficulty level.

(18)

The information processing device set forth in the preceding (17), in which the situation estimation unit detects attention behavior of the user.

(19)

The information processing device set forth in any of the preceding (1) to (18), further including an output unit that outputs the notification contents on the basis of control by the control unit.

(20)

An information processing method including controlling, by a processor, information notification to a user based on notification contents, in which the controlling further includes determining an output position of a subject in the notification contents on the basis of a calculated attention acquisition difficulty level related to the user.

REFERENCE SIGNS LIST

10 Information processing terminal
110 Sound collection unit
120 Sensor unit
130 Output unit
140 Communication unit
20 External device
210 Operating situation obtaining unit
220 Sensor unit
230 Communication unit
30 Information processing server
310 Acoustic analysis unit
320 Image analysis unit
330 Situation estimation unit
340 Natural language processing unit
350 User information DB
360 Speaking control unit
370 Voice synthesizing unit
380 Communication unit

The invention claimed is:

1. An information processing device, comprising:
   a situation estimation unit configured to calculate an attention acquisition difficulty level related to a user; and
   a control unit configured to:
   extract a subject from first notification contents;
   set an output position of the subject to a latter half of the first notification contents based on the calculated attention acquisition difficulty level that is higher than a first threshold value;
   generate second notification contents based on the output position of the subject that is set to the latter half of the first notification contents;
   add additional information to a beginning of the second notification contents based on the calculated attention acquisition difficulty level that is higher than a second threshold value;
   generate third notification contents that include the second notification contents and the additional information added to the beginning of the second notification contents; and
   control output of the third notification contents.

2. The information processing device according to claim 1, wherein the control unit is further configured to control voice output of the third notification contents based on the output position of the subject.

3. The information processing device according to claim 1, wherein the control unit is further configured to set the output position of the subject to a first half of the first notification contents based on the calculated attention acquisition difficulty level that is lower than or equal to the first threshold value.

4. The information processing device according to claim 1, wherein
   the situation estimation unit is further configured to detect an attention behavior of the user during the output of the third notification contents, and
   the control unit is further configured to change the output position of the subject based on the detected attention behavior of the user.

5. The information processing device according to claim 4, wherein
   the situation estimation unit is further configured to detect the attention behavior of the user during output of the additional information added to the beginning of the second notification contents, and
   the control unit is further configured to change the output position of the subject based on the attention behavior of the user that is detected during the output of the additional information.

6. The information processing device according to claim 5, wherein based on the detection of the attention behavior of the user during the output of the additional information, the control unit is further configured to end the output of the additional information, and change the output position of the subject to a position immediately after the additional information.

7. The information processing device according to claim 1, wherein
   the control unit is further configured to change the output position of the subject based on a change in the attention acquisition difficulty level, and
   the change in the attention acquisition difficulty level is during the output of the third notification contents.

8. The information processing device according to claim 1, wherein the additional information includes a related topic related to the first notification contents.

9. The information processing device according to claim 1, wherein the control unit is further configured to extract the subject from the first notification contents based on a result of natural language processing.

10. The information processing device according to claim 1, wherein the attention acquisition difficulty level is calculated based on at least one of a noise level or a situation of the user.

11. The information processing device according to claim 10, wherein
    the situation of the user includes a behavior situation of the user, and
    the attention acquisition difficulty level is calculated based on the behavior situation of the user.

12. The information processing device according to claim 11, wherein the behavior situation of the user is estimated based on work sounds that occur from a behavior of the user.

13. The information processing device according to claim 11, wherein the behavior situation of the user is estimated based on an operating situation of an external device.

14. The information processing device according to claim 11, wherein the behavior situation of the user is estimated based on an image of the user.

15. The information processing device according to claim 1, wherein the situation estimation unit is further configured to detect an attention behavior of the user.

16. The information processing device according to claim 1, further comprising an output unit configured to output the third notification contents based on the control by the control unit.

17. An information processing method, comprising:
    calculating, by a processor, an attention acquisition difficulty level related to a user;
    extracting, by the processor, a subject from first notification contents;
    setting, by the processor, an output position of the subject to a latter half of the first notification contents based on the calculated attention acquisition difficulty level that is higher than a first threshold value;
    generating, by the processor, second notification contents based on the output position of the subject that is set to the latter half of the first notification contents;
    adding, by the processor, additional information to a beginning of the second notification contents based on the calculated attention acquisition difficulty level that is higher than a second threshold value;
    generating, by the processor, third notification contents that include the second notification contents and the additional information added to the beginning of the second notification contents; and
    controlling, by the processor, output of the third notification contents.

* * * * *